United States Patent
Botkin et al.

(10) Patent No.: US 8,650,813 B2
(45) Date of Patent: *Feb. 18, 2014

(54) PHOTOVOLTAIC MODULE WITH REMOVABLE WIND DEFLECTOR

(71) Applicants: Jonathan Botkin, El Cerrito, CA (US); Simon Graves, Berkeley, CA (US); Matt Danning, Oakland, CA (US); Matthew Culligan, Berkeley, CA (US)

(72) Inventors: Jonathan Botkin, El Cerrito, CA (US); Simon Graves, Berkeley, CA (US); Matt Danning, Oakland, CA (US); Matthew Culligan, Berkeley, CA (US)

(73) Assignee: SunPower Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/893,170

(22) Filed: May 13, 2013

(65) Prior Publication Data

US 2013/0319511 A1 Dec. 5, 2013

Related U.S. Application Data

(63) Continuation of application No. 13/538,695, filed on Jun. 29, 2012, now Pat. No. 8,448,391, which is a continuation of application No. 12/492,729, filed on Jun. 26, 2009, now Pat. No. 8,234,824.

(60) Provisional application No. 61/076,486, filed on Jun. 27, 2008.

(51) Int. Cl.
*E04D 13/18* (2006.01)

(52) U.S. Cl.
USPC .................. 52/173.3; 136/251; 126/623

(58) Field of Classification Search
USPC ........... 52/173.3; 136/244, 251; 126/623, 704
See application file for complete search history.

(56) References Cited

U.S. PATENT DOCUMENTS

| | | | | |
|---|---|---|---|---|
| 6,148,570 A | * | 11/2000 | Dinwoodie et al. | 52/173.3 |
| 6,809,251 B2 | * | 10/2004 | Dinwoodie | 136/251 |
| 2005/0217716 A1 | * | 10/2005 | Masuda et al. | 136/244 |
| 2007/0144575 A1 | * | 6/2007 | Mascolo et al. | 136/246 |
| 2007/0151594 A1 | * | 7/2007 | Mascolo et al. | 136/245 |
| 2009/0242014 A1 | * | 10/2009 | Leary | 136/251 |
| 2011/0192098 A1 | * | 8/2011 | Chung | 52/173.3 |

* cited by examiner

*Primary Examiner* — Adriana Figueroa
(74) *Attorney, Agent, or Firm* — Blakely Sokoloff Taylor Zafman LLP

(57) ABSTRACT

A photovoltaic (PV) module assembly including a PV module, a deflector, and a clip. The PV module includes a PV device and a frame. A PV laminate is assembled to the frame, and the frame includes a support arm forming a seat. The deflector defines a front face and a rear face, with the clip extending from either the trailing frame member or the rear face of the deflector. In a mounted state, the deflector is nested within the seat and is releasably mounted to the trailing frame member via the clip. In some embodiments, the support arm forms a second seat, with the PV module assembly providing a second mounted state in which the deflector is in a differing orientation/slope, nested within the second seat and releasably mounted to the trailing frame member via the clip.

23 Claims, 20 Drawing Sheets

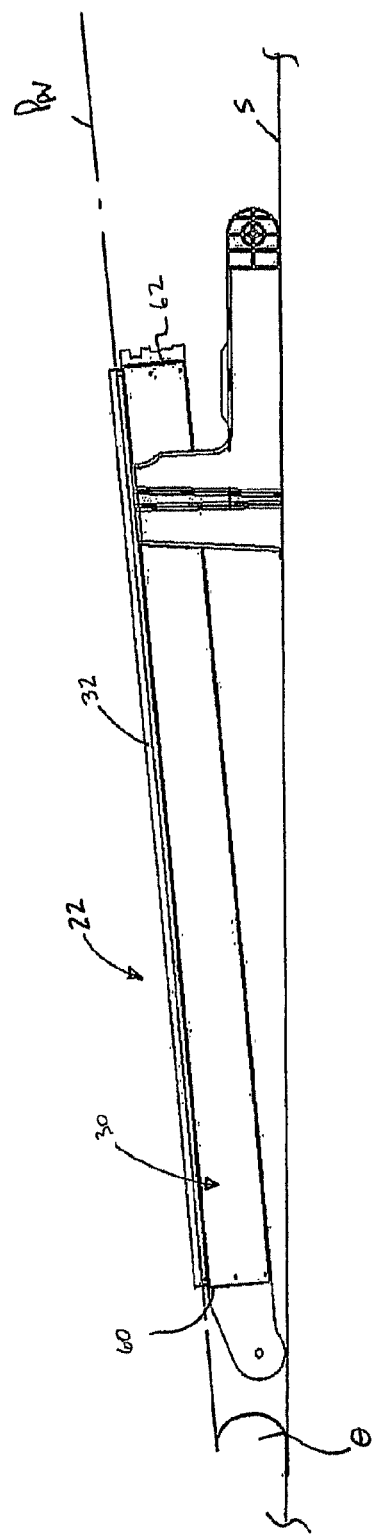

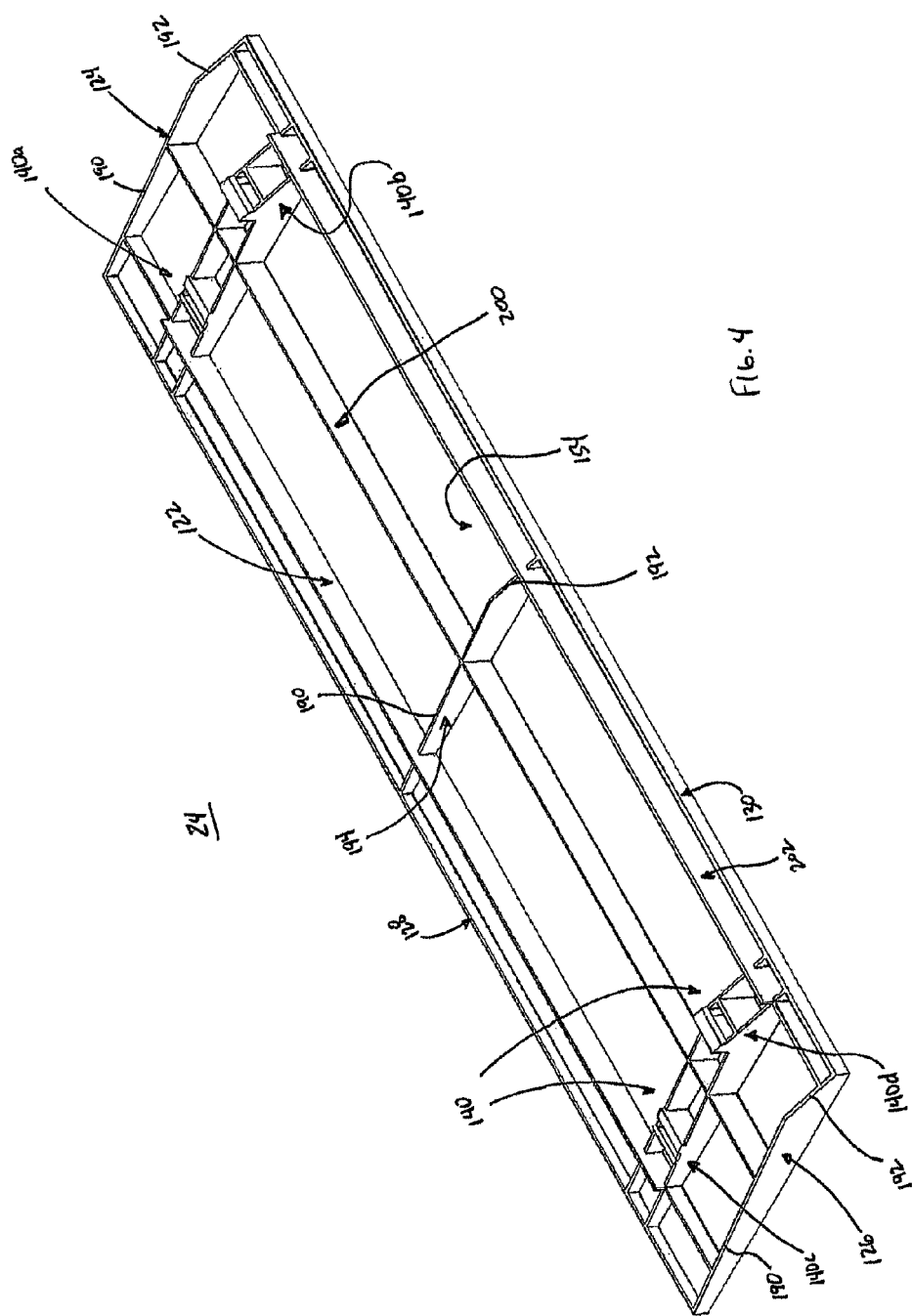

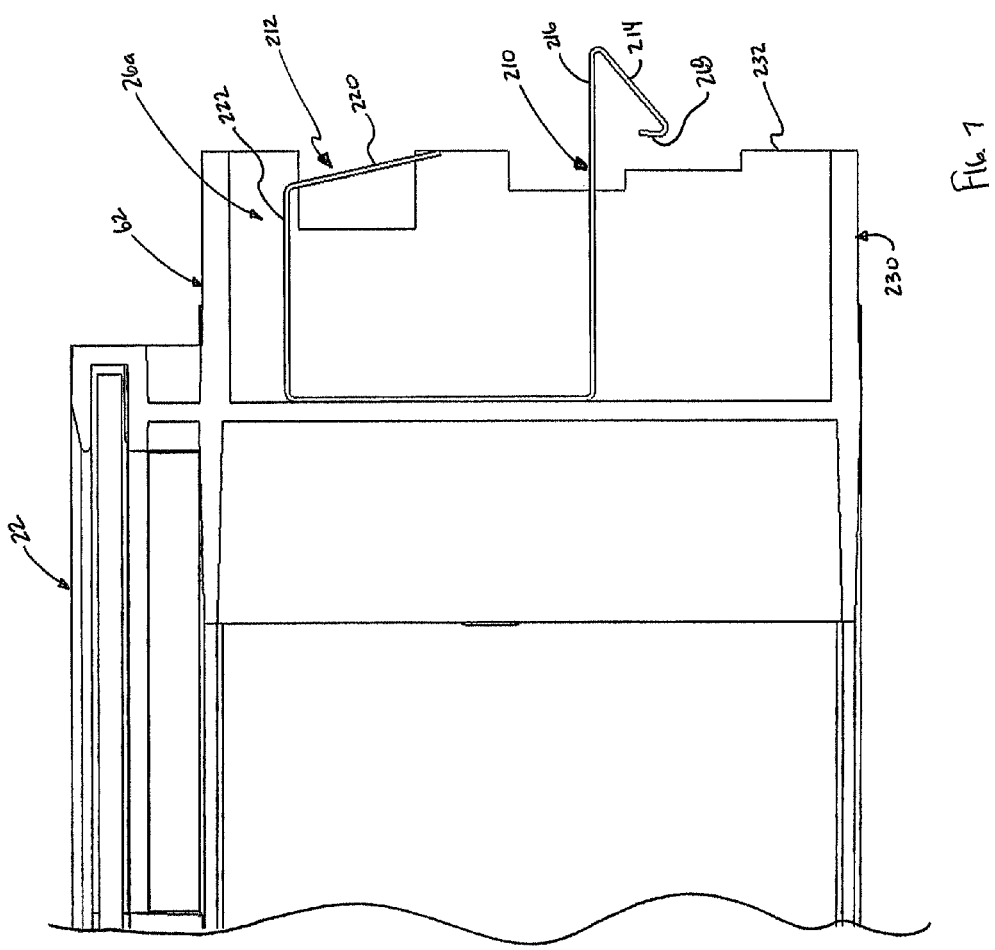

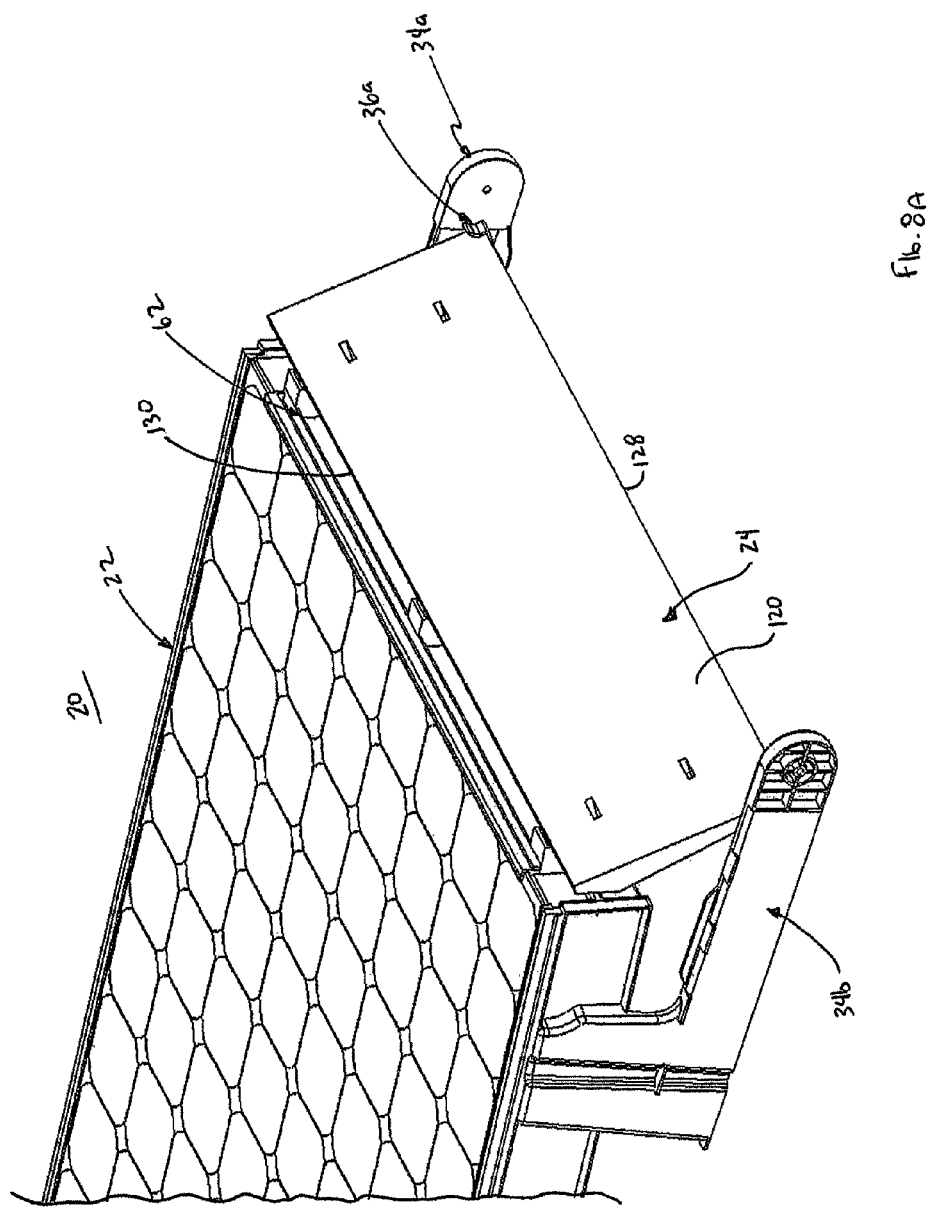

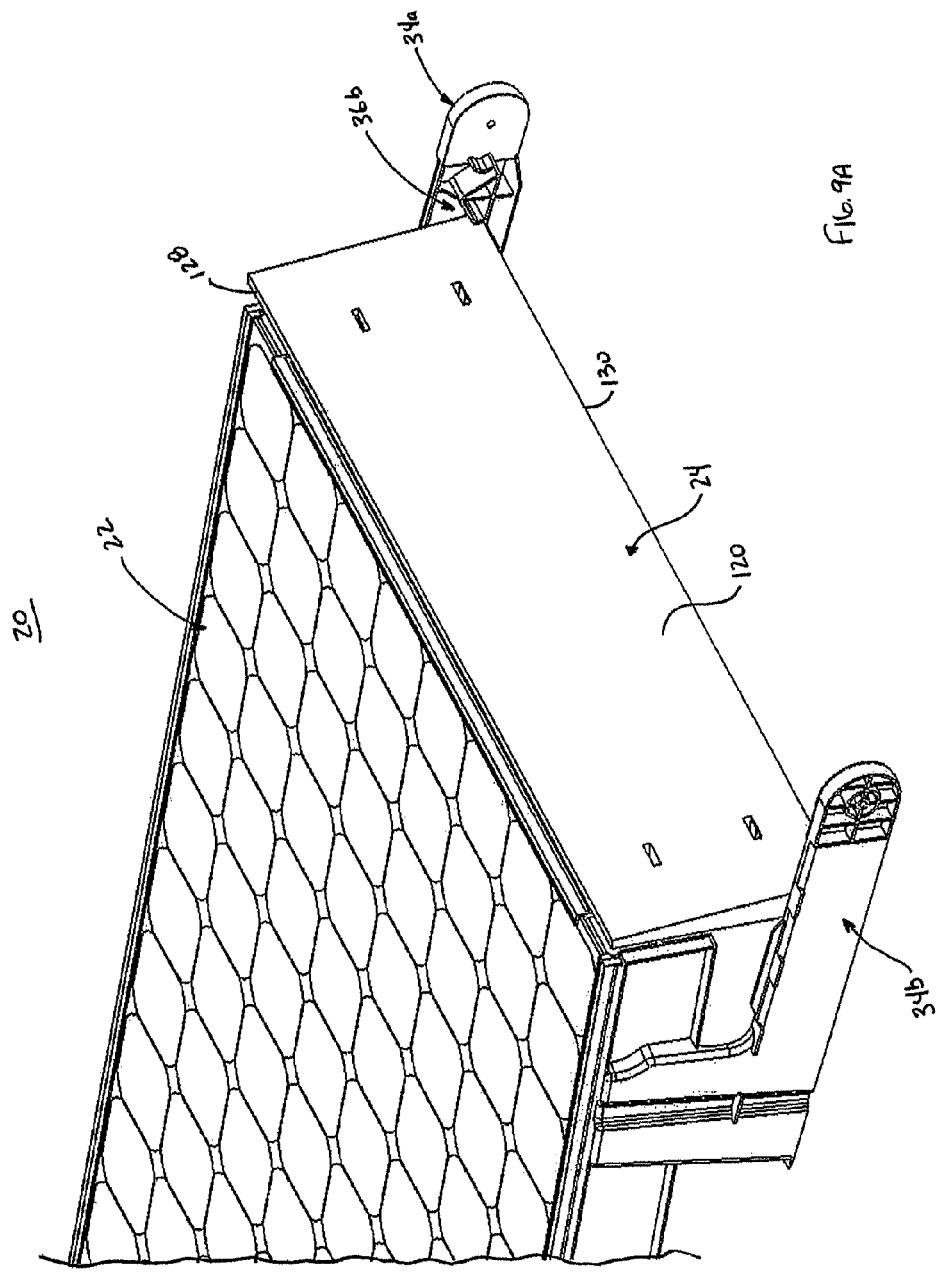

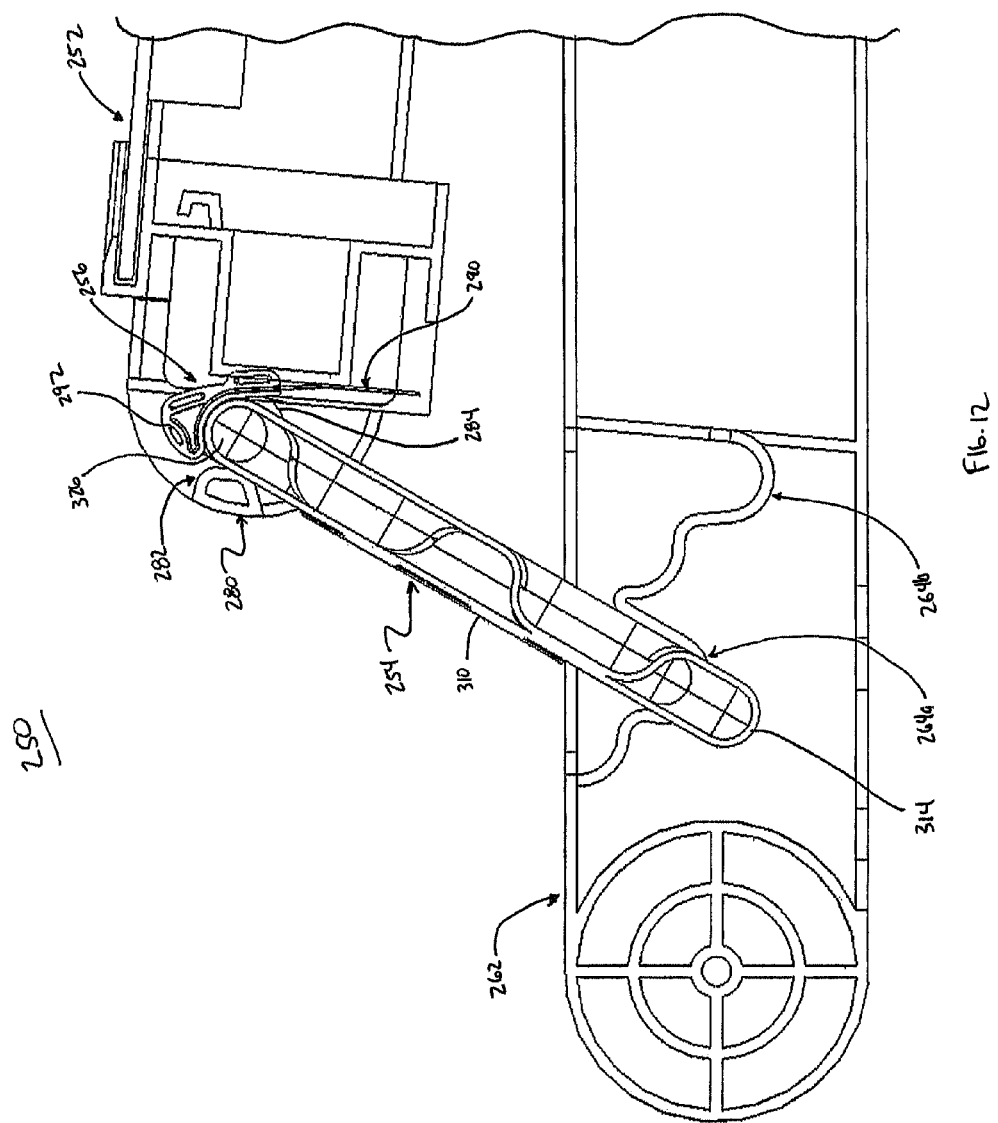

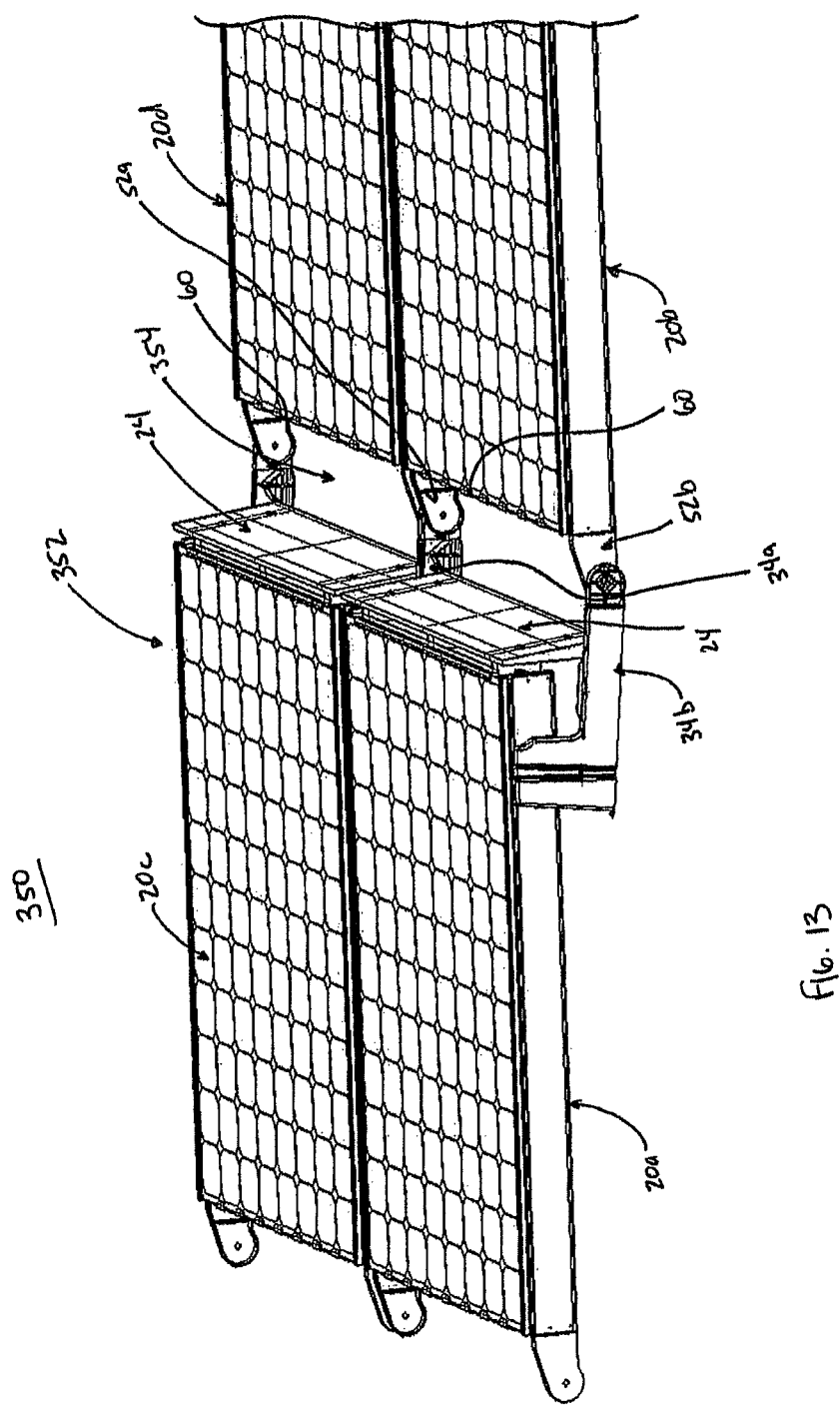

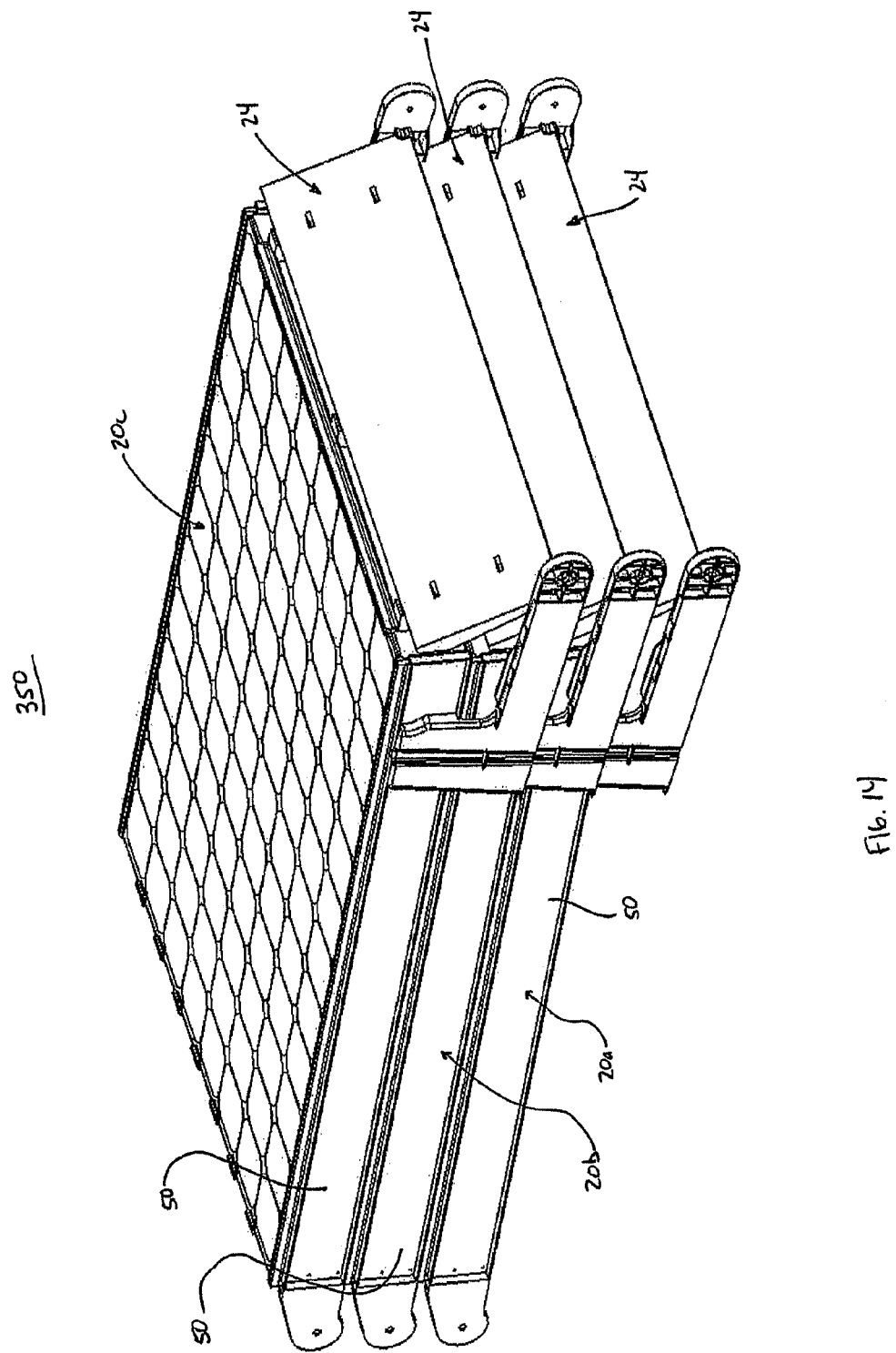

PHOTOVOLTAIC MODULE WITH REMOVABLE WIND DEFLECTOR

PRIORITY DATA

This application is a continuation of U.S. patent application Ser. No. 13/538,695, filed Jun. 29, 2012, which is a continuation of U.S. patent application Ser. No. 12/492,729, filed Jun. 26, 2009, now U.S. Pat. No. 8,234,824, issued on Aug. 7, 2012, which claims priority under 35 U.S.C. §119(e)(1) to U.S. Provisional Patent Application Ser. No. 61/076,486, filed Jun. 27, 2008, entitled "Photovoltaic Module with Removable Wind Deflector", and the entire teachings of which are incorporated herein by reference.

CROSS-REFERENCE TO RELATED APPLICATIONS

This application also relates to U.S. application Ser. No. 12/492,640 entitled "Ballasted Photovoltaic Module and Module Arrays", now U.S. Pat. No. 8,065,844, issued on Nov. 29, 2011; U.S. application Ser. No. 12/492,680 entitled "Photovoltaic Module Kit Including Connector Assembly for Non-Penetrating Array Installation", now U.S. Pat. No. 8,061,091, issued on Nov. 22, 2011; U.S. application Ser. No. 12/492,802 entitled "Photovoltaic Module and Module Arrays", now U.S. Pat. No. 8,220,210, issued on Jul. 17, 2012; and U.S. application Se. No. 12/492,838 entitled "Photovoltaic Module with Drainage Frame"; all of which were filed on even date herewith and the teachings of each of which are incorporated herein by reference.

STATEMENT REGARDING FEDERALLY SPONSORED RESEARCH OR DEVELOPMENT

This invention was made with Government support under Contract No. DE-FC36-07GO17043 awarded by the United States Department of Energy. The Government has certain rights in this invention.

BACKGROUND

The present disclosure relates to solar roof tiles. More particularly, it relates to photovoltaic module assemblies including a removably mountable wind deflector.

Solar power has long been viewed as an important alternative energy source. To this end, substantial efforts and investments have been made to develop and improve upon solar energy collection technology. Of particular interest are industrial- or commercial-type applications in which relatively significant amounts of solar energy can be collected and utilized in supplementing or satisfying power needs.

Solar photovoltaic technology is generally viewed as an optimal approach for large scale solar energy collection, and can be used as a primary and/or secondary (or supplemental) energy source. In general terms, solar photovoltaic systems (or simply "photovoltaic systems") employ solar panels made of silicon or other materials (e.g., III-V cells such as GaAs) to convert sunlight into electricity. More particularly, photovoltaic systems typically include a plurality of photovoltaic (PV) modules (or "solar tiles") interconnected with wiring to one or more appropriate electrical components (e.g., switches, inverters, junction boxes, etc.). The PV module conventionally consists of a PV laminate or panel generally forming an assembly of crystalline or amorphous semiconductor devices electrically interconnected and encapsulated. One or more electrical conductors are carried by the PV laminate through which the solar-generated current is conducted.

Regardless of an exact construction of the PV laminate, most PV applications entail placing an array of PV modules at the installation site in a location where sunlight is readily present. This is especially true for commercial or industrial applications in which a relatively large number of PV modules are desirable for generating substantial amounts of energy, with the rooftop of the commercial building providing a convenient surface at which the PV modules can be placed. As a point of reference, many commercial buildings have large, flat roofs that are inherently conducive to placement of a PV module array, and is the most efficient use of existing space. While rooftop installation is thus highly viable, certain environment constraints must be addressed. For example, the PV laminate is generally flat or planar; thus, if simply "laid" on an otherwise flat rooftop, the PV laminate may not be optimally positioned/oriented to collect a maximum amount of sunlight throughout the day. Instead, it is desirable to tilt the PV laminate at a slight angle relative to the rooftop (i.e., toward the southern sky for northern hemisphere installations, or toward the northern sky for southern hemisphere installations). Further, possible PV module displacement due to wind gusts must be accounted for, especially where the PV laminate is tilted relative to the rooftop as described above.

To address the above concerns, conventional PV module array installation techniques have included physically interconnecting each individual PV module of the array directly with, or into, the existing rooftop structure. For example, some PV module configurations have included multiple frame members that are physically attached to the rooftop via bolts driven through (or penetrating) the rooftop. While this technique may provide a more rigid attachment of the PV module, it is a time-consuming process and permanently damages the rooftop. Also, because holes are formed into the rooftop, distinct opportunities for water damage arise. More recently, PV module configurations have been devised for commercial, flat rooftop installation sites in which the arrayed PV modules are self-maintained relative to the rooftop in a non-penetrating manner. More particularly, the PV modules are interconnected to one another via a series of separate, auxiliary components. One or more wind-deflecting barriers (or "wind deflectors") are assembled to some or all of the PV modules to reduce (or deflect) a magnitude of wind forces imparted upon an underside of the PV module and/or array. Ballast may also be provided.

In light of the above, wind deflectors are important to the success of an installed, non-penetrating PV module array. One conventional PV module configuration permanently affixes the wind deflector(s) as part of the PV module and/or the mounting system used to interconnect adjacent PV modules in the array. The fixed wind deflector design can make installation and connection of the PV module array wiring highly difficult, and is characterized by substantial packaging and shipping costs. Conversely, other conventional PV module designs employ wind deflectors that are movable or removable relative to the PV module frame, and are installed thereto via bolts or other threaded fasteners. The corresponding installation process is labor-intensive, and can be a potential source of quality problems.

Regardless of the PV module/wind deflector format, the wind deflector(s) is typically arranged at an angle or sloped relative to the corresponding PV laminate (i.e., the wind deflector is non-perpendicular relative to the PV laminate) to optimize performance. At the northern edge of the PV array (for northern hemisphere installations), wind loads are typically at their highest and the wind deflector is beneficially arranged at a shallow slope. While existing PV module/wind deflector configurations may facilitate this desired sloped positioning, it is not possible to "select" a different wind deflector orientation. As a result, when two of the so-configured PV modules are connected to one another as part of an array, the shallow sloped wind deflector occupies a significant portion of the space between the PV modules, significantly impeding access for installation and maintenance. Even further, for a given wind deflector tilt angle, there is an ideal spacing (ground coverage ratio) that strikes a good balance between maximum output from the entire array and minimum losses from shading of one row by a neighboring row. Where the PV module/wind deflector allows for only a single wind deflector title angle, the ground coverage ratio of the corresponding array is essentially fixed, but many times may not be optional for a particular installation site.

In light of the above, any improvements in the construction of PV modules/wind deflectors for non-penetrating installation will be well-received.

SUMMARY

Some aspects in accordance with principles of the present disclosure relate to a photovoltaic (PV) module assembly including a PV module, a deflector, and a clip. The PV module includes a PV device and a frame. The PV device provides a PV laminate that is assembled to the frame. More particularly, the frame includes framework encompassing a perimeter of the PV laminate and having a trailing frame member. Further, the frame includes a support arm extending from the framework and beyond the trailing frame member, with the support arm forming a seat. The deflector defines a front face and a rear face. The clip extends from either the trailing frame member or the rear face of the deflector. With this in mind, the PV module assembly is configured to provide a mounted state in which the deflector is nested within the seat and is releasably mounted to the trailing frame member via the clip. In some embodiments, the support arm further forms a second seat, with the corresponding PV module assembly providing a second mounted state in which the deflector is nested within the second seat and is releasably mounted to the trailing frame member via the clip; an orientation of the front face of the deflector relative to the framework differs between the mounted states. In yet other embodiments, an orientation of the deflector relative to the support arm is reversed between the mounted states. In yet other embodiments, the clip includes a spring-type end that frictionally engages the deflector in the mounted state.

Other aspects in accordance with the present disclosure relate to a PV module assembly kit for non-penetrating installation to a substantially flat surface. The kit includes first and second PV module assemblies each having a PV module and a deflector as previously described. In some embodiments, the kit is configured to provide an installed state in which the frame of the first PV module assembly is connected to the frame of a second PV module assembly to define a PV module array. In yet other embodiments, the kit is configured to provide a shipping state in which the framework of the first PV module is stacked onto the framework of the second PV module, and the deflectors are mounted to the corresponding PV modules.

BRIEF DESCRIPTION OF THE DRAWINGS

FIG. 2 is a side view of a photovoltaic module portion of the assembly of FIG. 1 mounted to an installation surface;

FIG. 4 is a rear perspective view of a deflector portion of the assembly of FIG. 1;

FIG. 7 is an enlarged, cross-sectional view of a clip component in accordance with aspects of the present disclosure assembled to the photovoltaic module of FIG. 1;

FIGS. 8A-8C illustrate the photovoltaic module assembly of FIG. 1 in a first mounted state;

FIGS. 9A-9C illustrate the photovoltaic module assembly of FIG. 1 in a second mounted state;

FIG. 12 is a cross-sectional view of the assembly of FIG. 10;

FIG. 13 is a top perspective view of a photovoltaic module kit in accordance with aspects of the present disclosure and in an installed state to form a photovoltaic module array; and FIG. 14 is a side perspective view of the kit of FIG. 13 arranged in a shipping state.

DETAILED DESCRIPTION

Figure 1:
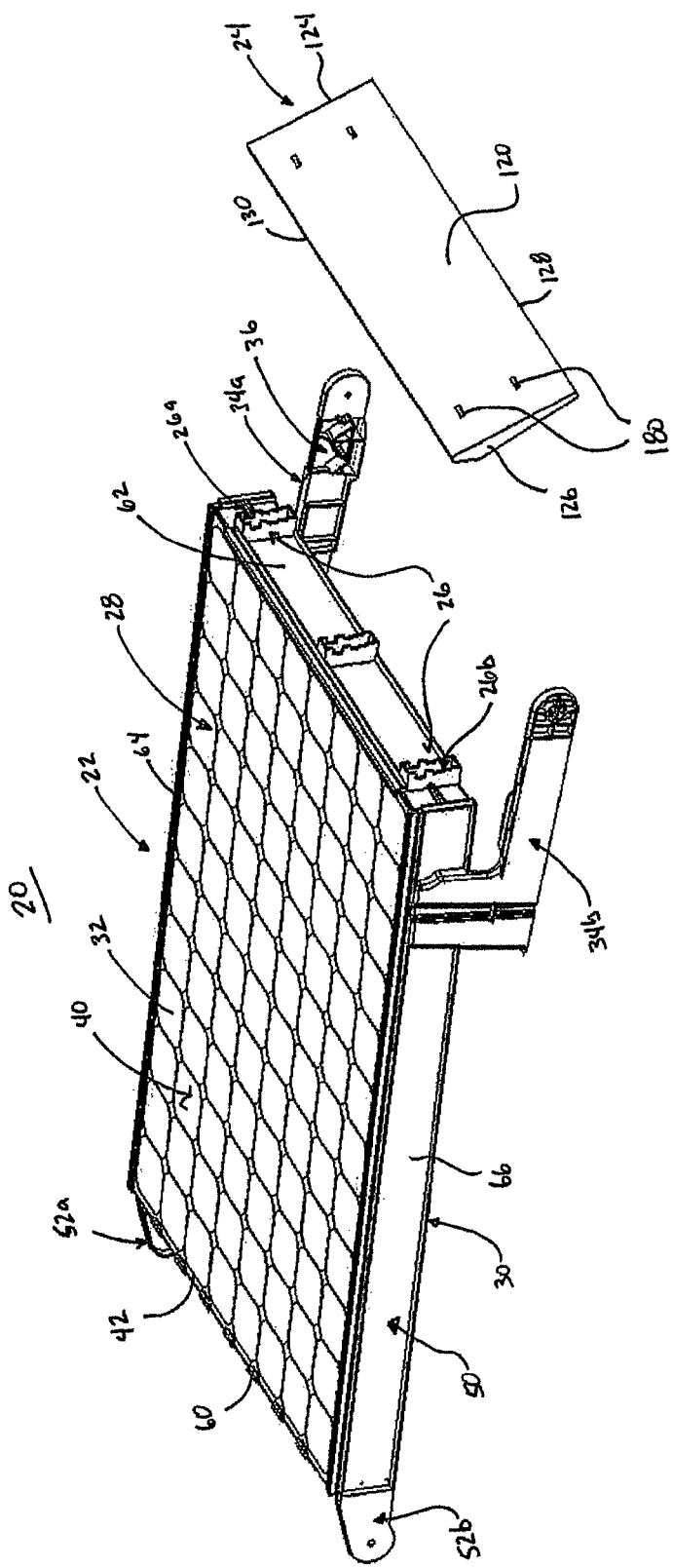
FIG. 1 is a perspective, exploded view of a photovoltaic module assembly in accordance with aspects of the present disclosure.

One embodiment of a photovoltaic (PV) module assembly 20 in accordance with principles of the present disclosure is shown in FIG. 1. The PV module assembly 20 includes a PV module 22, a deflector 24, and one or more clips 26. Details on the various components are provided below. In general terms, however, the PV module 22 includes a PV device 28 (referenced generally) and a frame 30. A PV laminate 32 of the PV device 28 is encased by the frame 30, with the frame 30 providing support faces that effectuate a tilted orientation of the PV laminate 32 relative to a flat installation surface (e.g., a flat rooftop). The frame 30 provides at least one support arm 34 (referenced generally) forming at least one seat 36. The deflector 24 is configured to be removably mounted to the PV module 22 via the clip(s) 26 and the seat(s) 36. With this configuration, the PV module assembly 20 is highly useful for non-penetrating, commercial rooftop installations in which the deflector 24 may or may not be necessary, and where provided, the deflector 24 is easily and removably assembled to the PV module 22, and optionally can be positioned in at least two different slopes or orientations. The PV module assembly 20 is beneficially installed to any substantially any substantially flat surface (e.g., maximum pitch of 2:12), including commercial rooftop, residential rooftop, or ground mount applications.

The PV module 22 can assume a variety of forms that may or may not be implicated by FIG. 1. For example, the PV device 28, including the PV laminate 32, can have any form currently known or in the future developed that is otherwise appropriate for use as a solar photovoltaic device. In general terms, the PV laminate 32 consists of an array of photovoltaic cells. A glass laminate may be placed over the photovoltaic cells for environmental protection. In some embodiments, the photovoltaic cells advantageously comprise backside-contact cells, such as those of the type available from SunPower Corp., of San Jose, Calif. As a point of reference, in backside-contact cells, wirings leading to external electrical circuits are coupled on the backside of the cell (i.e., the side facing away from the sun upon installation) for increased area for solar collection. Backside-contact cells are also disclosed in U.S. Pat. Nos. 5,053,083 and 4,927,770, which are both incorporated herein by reference in their entirety. Other types of photovoltaic cells may also be used without detracting from the merits of the present disclosure. For example, the photovoltaic cells can incorporate thin film technology, such as silicon thin films, non-silicon devices (e.g., III-V cells including GaAs), etc. Thus, while not shown in the figures, in some embodiments, the PV device 28 can include one or more components in addition to the PV laminate 32, such as wiring or other electrical components.

Regardless of an exact construction, the PV laminate 32 can be described as defining a front face 40 and a perimeter 42 (referenced generally in FIG. 1). Additional components (where provided) of the PV device 28 are conventionally located at or along a back face of the PV laminate 32, with the back face being hidden in the view of FIG. 1.

With the above understanding of the PV device 28, and in particular the PV laminate 32, in mind, the frame 30 generally includes framework 50 adapted to encompass the perimeter 42 of the PV laminate 32, along with the at least one support arm 34 extending from the framework 50. For example, with the one embodiment of FIG. 1, the frame 30 includes first and second support arms 34a, 34b. Additional arms, such as coupling arms 52a, 52b, can also be provided. As mentioned above, the support arms 34a, 34b can include one or more features that facilitate desired interface with the deflector 24 upon final installation, such as providing at least one of the seats 36. Further, the frame 30 is configured to facilitate arrangement of the PV laminate 32 at a tilted or sloped orientation relative to a substantially flat surface, such as a rooftop.

For example, the framework 50 can be described as including or providing a leading side or leading frame member 60, a trailing side or trailing frame member 62, a first side or first side frame member 64, and a second side or second side frame member 66. With these conventions in mind, FIG. 2 provides a simplified illustration of the PV module 22 relative to a flat, horizontal surface S. Though hidden in the view of FIG. 2, a location of the PV laminate 32 is generally indicated, as is a plane $P_{PV}$ of the PV laminate 32 that is otherwise established by the front face 40 (FIG. 1). Relative to the arrangement of FIG. 2, the frame 30 supports the PV laminate 32 relative to the flat surface S at a slope or tilt angle θ. The tilt angle θ can otherwise be defined as an included angle formed between the PV laminate plane $P_{PV}$ and a plane of the flat surface S. In some embodiments, the frame 30 is configured to support the PV laminate 32 at a tilt angle θ in the range of 1°-30°, in some embodiments in the range of 3°-7°, and in yet other embodiments at 5°. As a point of reference, with tilted PV solar collection installations, the PV laminate 32 is desirably positioned so as to face or tilt southward (in northern hemisphere installations). Given this typical installation orientation, then, the leading frame member 60 can thus be generally referred to as a south frame member, and the trailing frame member 62 referred to as a north frame member. In other embodiments, however, the frame 30 can be configured to maintain the PV laminate 32 in a generally parallel relationship relative to the flat surface S.

Returning to FIG. 1, the framework 50 can assume a variety of forms appropriate for encasing the perimeter 42 of the PV laminate 32, as well as establishing the desired tilt angle θ (FIG. 2). In some embodiments, the frame members 60-66 are separately formed and subsequently assembled to one another and the PV laminate 32 in a manner generating a unitary structure upon final construction. Alternatively, other manufacturing techniques and/or components can be employed such that the framework 50 reflected in FIG. 1 is in no way limiting.

As mentioned above, the frame 30 includes at least one of the support arms 34a or 34b extending from the framework 50 to provide the at least one seat 36. While FIG. 1 reflects two of the support arms 34a, 34b, in other embodiments, a greater or lesser number can be included. With respect to the one non-limiting example of FIG. 1, the support arms 34a, 34b are identical upon final construction of the frame 30. With this in mind, the first support arm 34a is described in greater detail with reference to FIGS. 3A and 3B. The first support arm 34a is formed as an extension of, or assembled to, the first side frame member 64, and includes a shoulder 70 (best shown for the second support arm 34b in FIG. 3A) and a foot 72. The foot 72 extends from the shoulder 70, projecting longitudinally beyond (e.g., rearward of) the trailing frame member 62.

The foot 72 includes or forms two of the seats 36, including a first seat 36a and a second seat 36b. As described below, the seats 36a, 36b serve to establish differing orientations or positions of the deflector 24 (FIG. 1) upon final assembly. In this regard, the first seat 36a is positioned longitudinally beyond the second seat 36b. In other words, the second seat 36b is between the first seat 36a and the trailing frame member 62. In other embodiments, only one of the seats 36a or 36b is provided; in yet other embodiments, three or more of the seats 36 are included.

Dimensional attributes of the seats 36a, 36b are selected in accordance with dimensional features of the deflector 24 (FIG. 1) as described below. In general terms, however, the first seat 36a extends inwardly from a panel 80 of the foot 72, and includes side walls 82-86 combining to form a slot 88. The side walls 82-86 can be supported relative to the panel 80 via one or more interconnecting ribs 90. While one or both of the first and/or second side walls 82, 84 can be rigidly affixed to the panel 80, as is the third side wall 86. In alternative embodiments, the third side wall 86 is deflectable relative to the panel 80, and in particular relative to the first and second side walls 82, 84. In this regard, the first seat 36a is constructed such that the third side wall 86 is naturally biased to the orientation of FIGS. 3A and 3B, but can be deflected away from the first side wall 82 (e.g., pivoting at the intersection of the second and third side walls 84, 86). Thus, a size of the slot 88 can be increased from that shown in the figures. Regardless, the slot 88 is sized to effectuate frictional capturing of a portion of the deflector 24 (FIG. 1) where the corresponding deflector portion has a width or thickness greater than a width of the slot 88 in the normal state, as well as permitting slight rotation of the deflector 24 relative the seat 36a as described below.

The second seat 36b has a construction generally conforming with that described above with respect to the first seat 36a, and includes side walls 100-104 extending inwardly relative to the panel 80 and combining to form a slot 106 sized to frictionally receive and maintain a portion of the deflector 24 (FIG. 1). Once again, one or more of the side walls 100-104 are supported by the panel 80 via the rib(s) 90. Each of the side walls 100-104 can be rigidly affixed to the panel 80. In some alternative embodiments, one or both of the first and/or third side walls 100, 104 are deflectable relative to the panel 80, and thus relative to one another. This but one acceptable construction permits enlargement of the slot 106 where desired (e.g., to frictionally receive a larger-width portion of the deflector 24).

The seats 36a, 36b are located vertically above a lower face 110 of the foot 72. As a point of reference, the lower face 110 serves as a support face for the PV module 22 as described above with respect to FIG. 2, and is adapted for placement on a flat installation surface. In some embodiments, the foot 72 further forms a mounting region 112 adjacent a terminating end 114. Where provided, the mounting region 112 is defined at a spatial location that is longitudinally beyond the seats 36a, 36b (and thus longitudinally spaced from the trailing frame member 62 upon final construction). The optional mounting region 112 is adapted to promote mounting of the support arm 34a to a similar component (e.g., one of the coupling arms 52 of FIG. 1) of a separate, identically-constructed PV module 22 in an end-to-end arrangement. For example, the mounting region 112 can include a laterally-extending bore 116. Alternatively, the mounting region 112 can assume a wide variety of other forms, and in other embodiments, can be omitted.

Returning to FIG. 1, the support arm(s) 34 can have differing constructions from those described above, and can extend from, or be associated with, any portion of the framework 50. Further, the support arm(s) 34 need not necessarily serve to support the PV module 22 relative to an installation surface, In more general terms, then, the support arm(s) 34 provides the one or more seats 36 spatially positioned and configured to selectively interface with the deflector 24 upon final mounting to the PV module 22.

The deflector 24 generally includes or defines a front face 120, a rear face 122 (hidden in FIG. 1, but shown in FIG. 4), opposing, first and second sides 124, 126, and opposing, first and second ends 128, 130. The deflector 24 further incorporates one or more features that facilitate releasable mounting to the PV module 22 as described below. Regardless, the front face 120 can be substantially flat or planar, serving to direct wind in a desired fashion upon mounting of the deflector 24 to the PV module 22. Alternatively, other non-planar configurations (e.g., curved) are also acceptable for the front face 120.

With specific reference to FIG. 4, the deflector 24 forms or defines one or more receptacles 140 (referenced generally) at the rear face 122 adapted to interface with the clip(s) 26 (FIG. 1) as described below. As a point of reference, the configuration of the deflector 24 reflected in FIG. 4 is with respect to embodiments in which the clip(s) 26 is assembled to, and extends from, the framework 50 (FIG. 1). In other embodiments, however, the clip(s) 26 can be assembled to, and extends from, the deflector 24 (in particular the rear face 122). Thus, the following description of the receptacle 140 as a component of the deflector 24 is equally applicable to alternative embodiments in which the receptacle(s) 140 is provided as part of the framework 50.

FIG. 4 illustrates the deflector 24 as forming four of the receptacles 140a-140d, with the first and second receptacles 140a, 140b vertically aligned as a receptacle pair, as are the third and fourth receptacles 140c, 140d. Further, the first and third receptacles 140a, 140c are identical but laterally spaced from one another, as are the third and fourth receptacles 140c, 140d. In other embodiments, however, a greater or lesser number of the receptacles 140a-140d can be provided.

Figure 5:
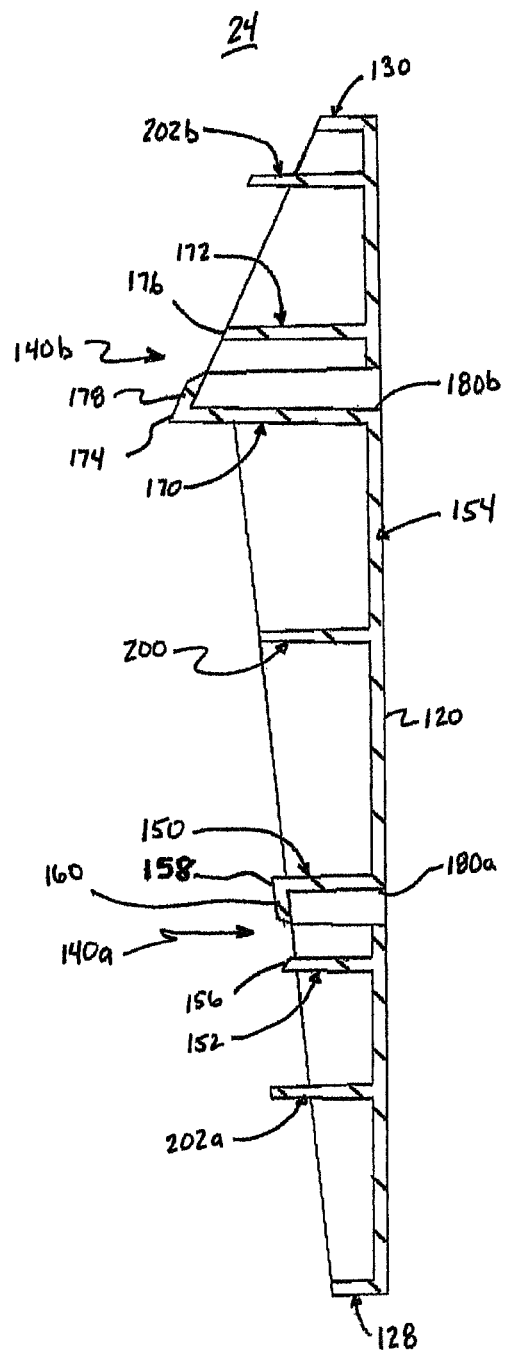
FIG. 5 is a transverse cross-sectional view of the deflector of FIG. 4.

The first receptacle 140a (as well as the third receptacle 140c) is formed adjacent the first end 128 (i.e., a spacing between the first receptacle 140a and the first end 128 is less than a spacing between the first receptacle 140a and the second end 130), and is defined in part by opposing, first and second wall members 150, 152 as best shown in FIG. 5. More particularly, the wall members 150, 152 extend from a main body 154 of the deflector 24, each terminating at an end 156, 158. In some embodiments, a length of the first wall member 150 is greater than that of the second wall member 152, such that the end 156 of the first wall member 150 is longitudinally beyond the end 158 of the second wall member 152. Regardless, the first wall member 150 forms a lip 160 at the corresponding end 156. As described below, the lip 160 is configured to effectuate capturing of a corresponding portion of the clip 26 (FIG. 1), with a spatial location of the first wall member 150 relative to the second end 126 selected to ensure interaction of the clip portion with the lip 160 as described below. Along these same lines, a vertical spacing between the wall members 150, 152 is selected to facilitate placement of the clip portion within the first receptacle 140a.

Returning to FIG. 4, the second receptacle 140b (as well as the fourth receptacle 140d) has a generally similar construction, and is formed adjacent the second end 130 (e.g., a longitudinal spacing between the second receptacle 140b and the second end 130 is less than a longitudinal spacing between the second receptacle 140b and the first end 128). In this regard, the second receptacle 140b is defined, at least in part, by opposing, first and second wall members 170, 172 each extending from the main body 154 and terminating at an end 174, 176, respectively, as shown in FIG. 5. The first wall member 170 forms a lip 178 at the end 174. The lip 178 is constructed to selectively engage with the clip segment referenced above, with a lateral spacing between the wall members 170, 172 selected to permit insertion and removal of the clip segment relative to the second receptacle 140b. As compared to the first receptacle 140a, the second receptacle 140b extends a greater distance from the main body 154, commensurate with an overall shape or footprint of the deflector 24.

The deflector 24 can provide one or more features that facilitate access to the receptacle(s) 140 via the front face 120. As shown in FIG. 1, the deflector 24 can form one or more passages 180 (referenced generally) that are open at the front face 120 as well as to respective ones of the receptacles 140a-140d (FIG. 4). For example, a first passage 180a is open to the first receptacle 140a and a second passage 180b is open to the second receptacle 140b as shown in FIG. 5. As described below, the passage(s) 180 facilitate disassembly of the deflector 24 from the PV module 22.

Figure 6:
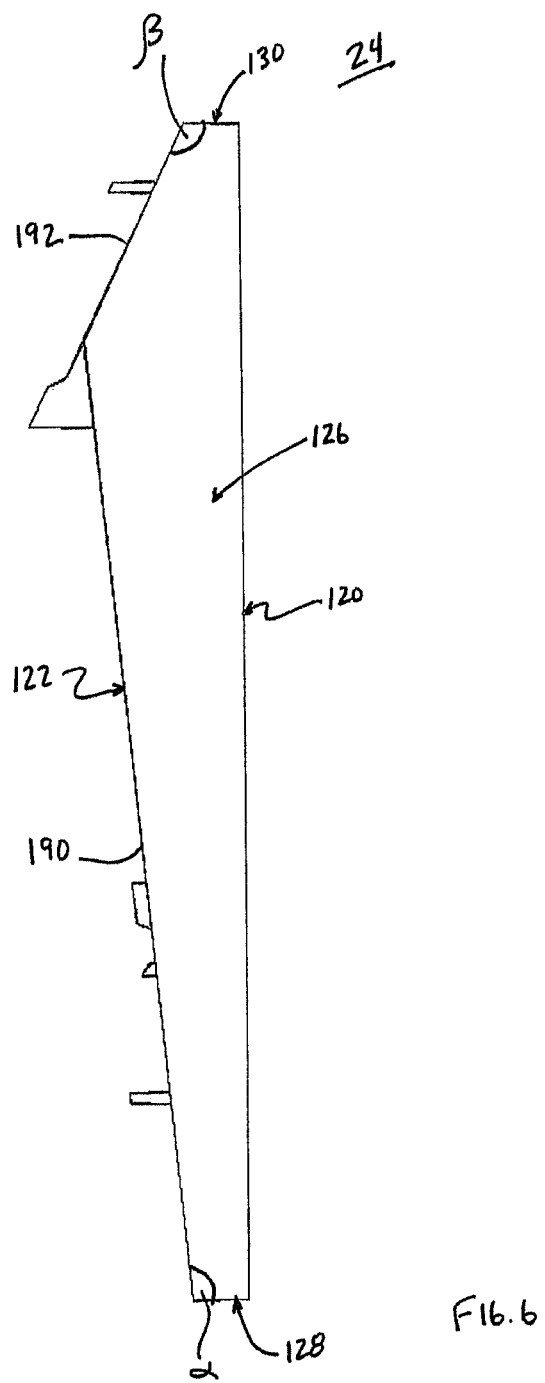
FIG. 6 is a side view of the deflector of FIG. 4.

In addition to the receptacle(s) 140, one or more dimensional features of the deflector 24 promote consistent arrangement of the deflector 24 relative to the PV module 22 at two (or more) useful orientations. As shown in the side view of FIG. 6, the rear face 122, for example as defined along the second side 126, includes a first segment 190 extending from the first end 128, and a second segment 192 extending from the second end 130. The ends 128, 130 each form a substantially right angle in extension from the front face 120. In contrast, the first and second segments 190, 192 extend at a non-right angle relative to the corresponding end 128, 130. For example, extension of the first segment 190 from the first end 128 defines an angle $\alpha$, whereas extension of the second segment 192 from the second end 130 defines an angle $\beta$. For reasons made clear below, the first angle $\alpha$ is less than the second angle $\beta$, with the first segment 190 optionally having a length greater than that of the second segment 192. Thus, while the first and second segments 190, 192 are substantially linear for establishing a support plane relative to the frame 30 (FIG. 1), the spatial orientations and dimensions of the segments 190, 192 differ to facilitate arrangement of the front face 120 at differing angles relative to the PV module 22. In some embodiments, the above-described segments 190, 192 are formed at each of the first and second sides 124, 126 as shown in FIG. 4. Further, an optional, intermediate partition 194 can be provided that includes the corresponding rear face segments 190, 192. In yet other embodiments, the rear face segments 190, 192 can be formed elsewhere along the deflector 24 (i.e., at locations apart from one or both of the sides 124, 126), and can have constructions differing from those reflected in FIG. 6.

The deflector 24 can include additional, optional features reflected in FIG. 4. For example, rib(s) 200 can be formed as projections from the main body 154 along the rear face 122 that collectively enhance an overall stiffness of the deflector 24. Further, one or more slats 202 (referenced generally) can be associated with one or more, and in some embodiments all, of the receptacles 140a-140d. For example, and as best shown in FIG. 5, a first slat segment 202a is formed adjacent the second wall member 152 of the first receptacle 140a, a second slat segment 202b is formed adjacent the second wall member 172 of the second receptacle 140b, etc. As described below, the optional slat or slat segments 202 provide a surface for enhanced stabilization of the deflector 24 upon assembly to the PV module 22 (FIG. 1).

Figure 3A:
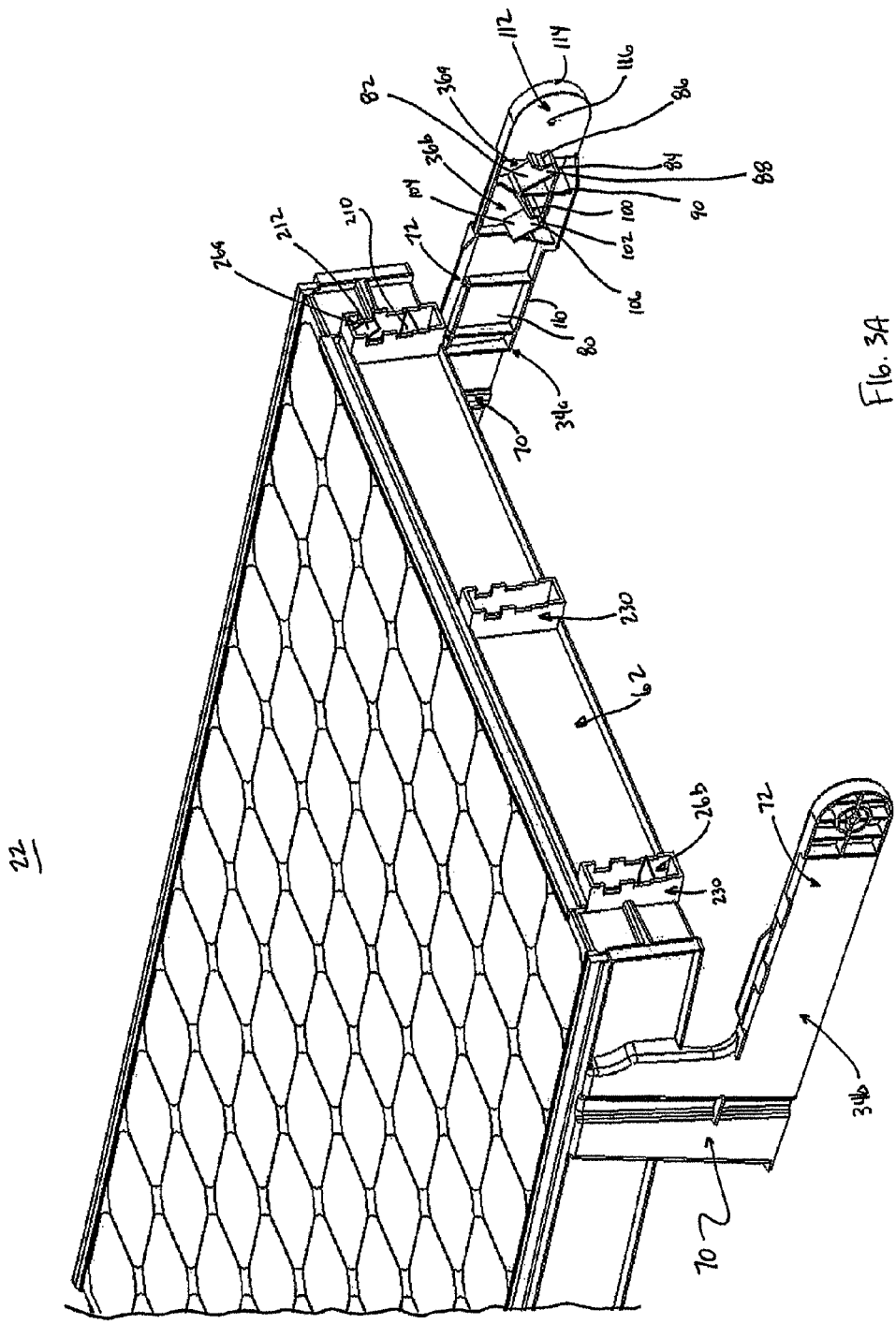
FIG. 3A is an enlarged, perspective view of a portion of a photovoltaic module portion of the assembly of FIG. 1.
Figure 3B:
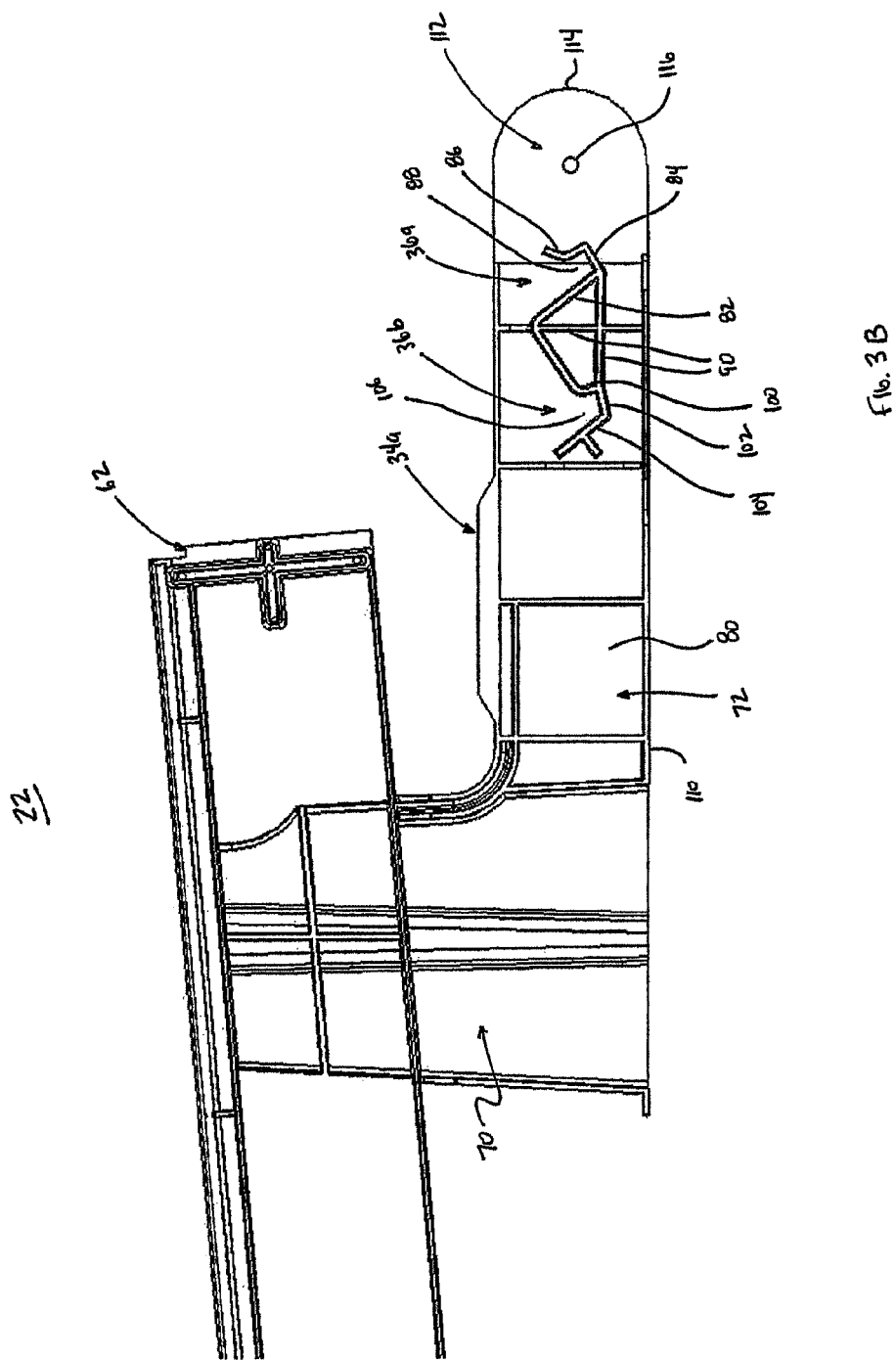
FIG. 3B is an interior side view of the portion of FIG. 3A.

Returning to FIG. 1, and with additional reference to FIG. 3A, the clip(s) 26 can assume a variety of forms adapted to facilitate releasable mounting of the deflector 24 to the frame 30. In some embodiments, the PV module assembly 20 includes two of the clips 26a, 26b, assembled to, and extending from, the trailing frame member 62. Alternatively, a greater or lesser number can be incorporated, and/or can extend from other portions of the frame 30 (e.g., the support arms 34). Further and as previously mentioned, the clip(s) 26 can be assembled to, and extend from, the deflector 24 in other embodiments envisioned by the present disclosure. In yet other embodiments, the clip(s) 26 can be omitted, with the corresponding PV module frame including one or more features adapted to frictionally interface with corresponding components of the deflector 24 in a releasable fashion.

With the one acceptable construction of FIG. 3A, the clips 26a, 26b are identical and are provided as spring bodies each having a retention portion 210 and a load portion 212. While the retention portion 210 and the load portion 212 are illustrated as being connected to one another as an integral, homogenous body, in other embodiments the portions 210, 212 are separately provided and assembled to the trailing frame member 62.

The retention portion 210 serves to establish a frictionally locked engagement with the deflector 24 (FIG. 1). With reference to FIG. 7 that otherwise depicts the first clip 26a in greater detail, the retention portion 210 includes a head 214 extending from a neck 216. The neck 216 is supported by the trailing frame member 62, with the head 214 extending downwardly and rearwardly from the neck 216. In this regard, the clip 26a, and in particular the retention portion 210, is formed of a relatively rigid yet resilient material (e.g., steel spring wire), with the head 214 naturally assuming the orientation relative to the neck 216 as illustrated. However, the head 214 is repeatably deflectable from the orientation of FIG. 7 (i.e., toward the neck 216); in the deflected state, the retention portion 210 self-generates a biasing force at the head 214, causing the head 214 to self-return back toward the natural or unbiased orientation. Optionally, the retention portion 210 can further include a finger 218 extending from the head 214 opposite the neck 216. A transition of the retention portion 210 between the head 214 and the finger 218 establishes a relatively smooth surface for interfacing with the deflector 24 (FIG. 1) as described below. Further, the finger 218 is sized to establish an abutment surface for ensuring a captured, final mounting relationship relative to a corresponding component of the deflector 24.

The load portion 212 can be formed as a continuation of the retention portion 210, and includes a leg 220 extending from a base 222. In this regard, the base 222 is supported by the trailing frame member 62, with the leg 220 being deflectable (e.g., inwardly) relative to the base 222. With constructions in which the clip 26, and in particular the load portion 212, is formed of a rigid, yet resilient material (e.g., metal spring wire), the leg 220 is self-biased to the orientation of FIG. 7, and generates a biasing force upon deflection for reasons made clear below.

In some embodiments, the clip 26a is mounted within a support column 230 formed by, or assembled to, the trailing frame member 62. Additional support columns 230 can further be provided (as shown in FIG. 3A). Regardless, the support column 230 forms a support face 232 against which the deflector 24 (FIG. 1) can abut to provide desired alignment of the deflector 24 relative to the trailing frame member 62 (and thus relative to the PV module 22). By positioning the clip 26a within the support column 230 (as well as other ones of the clips 26 within other, separate support columns 230), the biasing force(s) generated by the clip(s) 26 are applied in close proximity to the support face 232 to better ensure desired interface with the deflector 24.

Returning to FIG. 1, the PV module assembly 20 is constructed to provide two (and optionally three or more) mounted states of the deflector 24 relative to the PV module 22. For example, FIG. 8A illustrates a first mounted state of the PV module assembly 20 in which the deflector 24, and in particular the front face 120, is arranged at a first angle or slope relative to the PV module 22. The first end 128 of the deflector 24 is nested within the first seat 36a of the first support arm 34a (as well as the corresponding seat (hidden in FIG. 8A) of the second support arm 34b). The second end 130 is positioned proximate the trailing frame member 62.

Figure 8B:
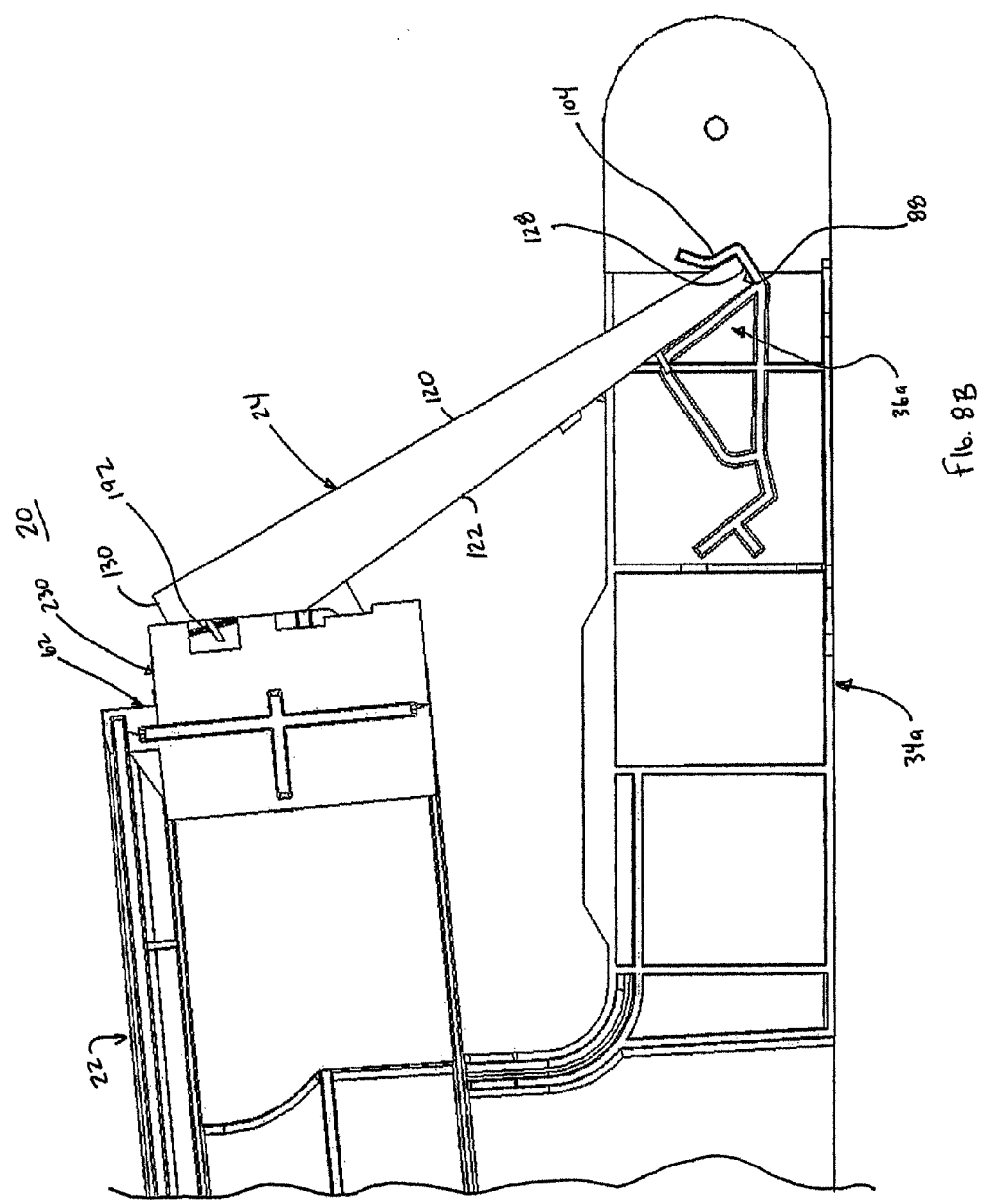
Figure 8C:
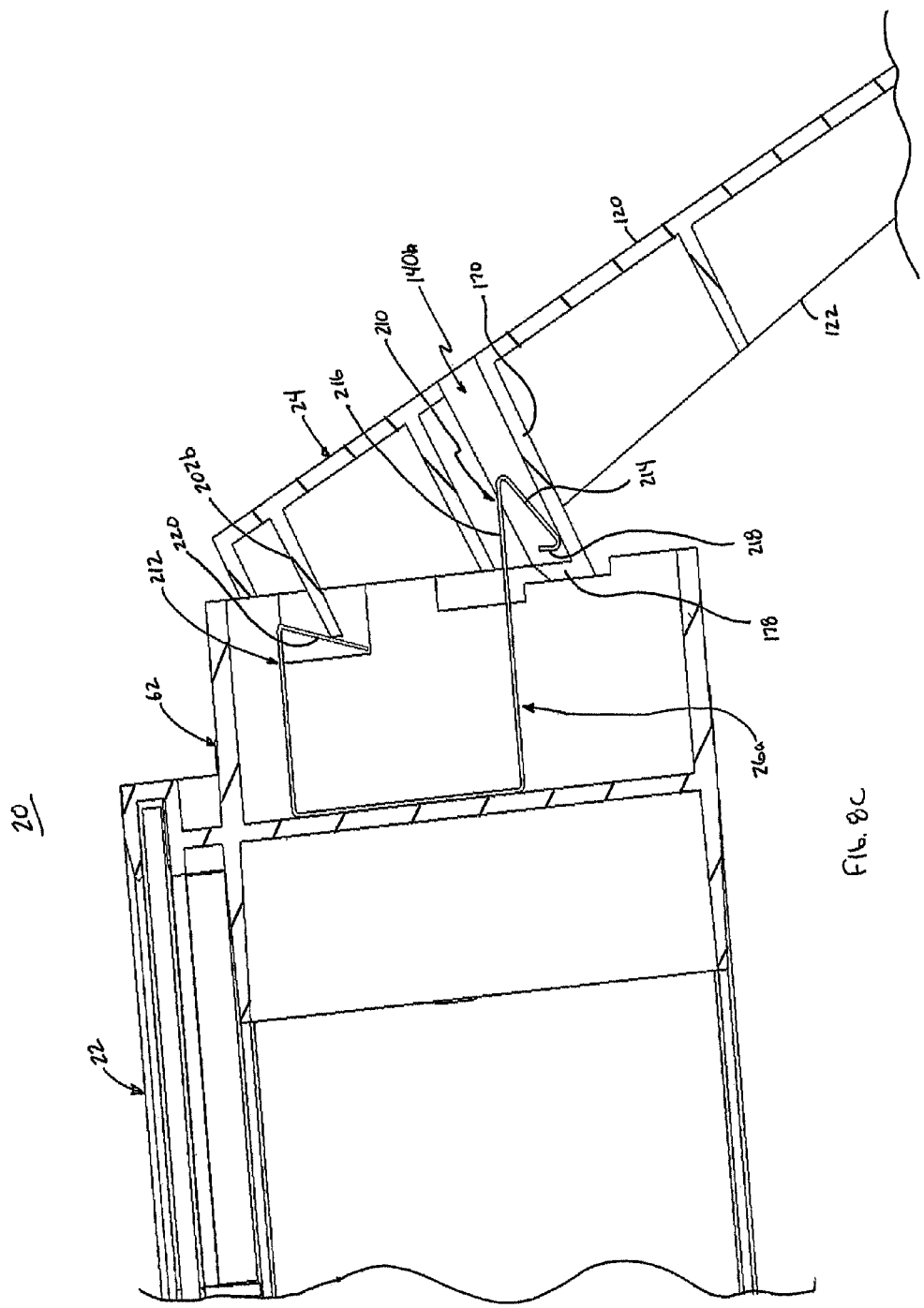

The mounted relationship is more clearly reflected in FIG. 8B. The first end 128 is located within the slot 88 of the first seat 36a, with the third side wall 88 applying a slight force onto the front face 120 to frictionally capture the first end 128 (i.e., a width of the deflector 24 at the first end 128 is greater than a width of the slot 88). With alternative embodiments in which the third side wall 86 is deflectable, upon insertion of the first end 128 into the slot 88, the third side wall 86 slightly deflects to accommodate the first end 128, and applies a biasing force to frictionally maintain the first end 128 within the slot 88. Conversely, the second end 130 is located vertically above the first end 128, with the second segment 192 of the rear face 122 abutting the support column 230 of the trailing frame member 62. As shown in FIG. 8C, in the first mounted state the deflector 24 is oriented such that the retention portion 210 of the first clip 26a is received within the second receptacle 140b of the deflector 24, with the head 214 bearing against the first wall member 170. More particularly, upon insertion of the retention portion 210 into the second receptacle 140b, the head 214 contacts the first wall member 170; as the rear face 122 is further maneuvered toward the trailing frame member 62, the head 214/first wall member 170 interface causes the head 214 to deflect relative to the neck 216, resulting in a biasing force being applied by the head 214 onto the first wall member 170. The retention portion 210 thus effectively locks the deflector 24 in the orientation of FIGS. 8A-8C. The lip 178 and the finger 218 prevent inadvertent dislodgement of the deflector 24 from the retention portion 210 (i.e., abutting interface between the lip 178 and the finger 218 prevents complete dislodgement of the deflector 24 from the retention portion 210).

In addition to the frictional mounting described above, the slat segment 202b interfaces with the load portion 212 of the clip 26a in a manner that limits vibration or rattling of the deflector 24. In particular, with positioning of the deflector 24 to the orientation of FIG. 8C, the slat segment 202b contacts and deflects the leg 220 from a natural orientation (FIG. 7). Thus, in the first mounted state of FIG. 8C, the leg 220 exerts a biasing force onto the slat segment 202b, thereby attenuating possible vibrational or rattling forces experienced by the deflector 24.

In accordance with some embodiments, the first mounted state of FIGS. 8A-8C is accomplished by an installer in a highly straightforward manner. The installer initiates the mounting process by inserting the first end 128 of the deflector 24 into the first seat 36a, with the second end 130 being spaced away from the clip 26a. Subsequently, the second end 130 is rotated toward the trailing frame member 62, effectively pivoting at the interface of the first end 128 relative to the first seat 36a. In this regard, dimensional characteristics of the PV module assembly 20 are such that with rotation of the deflector 24 from this initial installation position, the retention portion 210 of the clip 26a is naturally or automatically "aligned" with the second receptacle 140b, thereby bringing the retention portion 210 into the captured, biased or mounted state of FIGS. 8A-8C. Notably, deflector mounting processes in accordance with aspects of the present disclosure advantageously do not require the installer to use a tool. Though not shown in the views of FIGS. 8A-8C, it will be understood that an identical relationship is provided in the first mounted state between the first end 128 and the first seat 36a of the second support arm 34b (FIG. 1), and between the second clip 26b (FIG. 1) and the fourth receptacle 140d (FIG. 4).

Figure 8D:
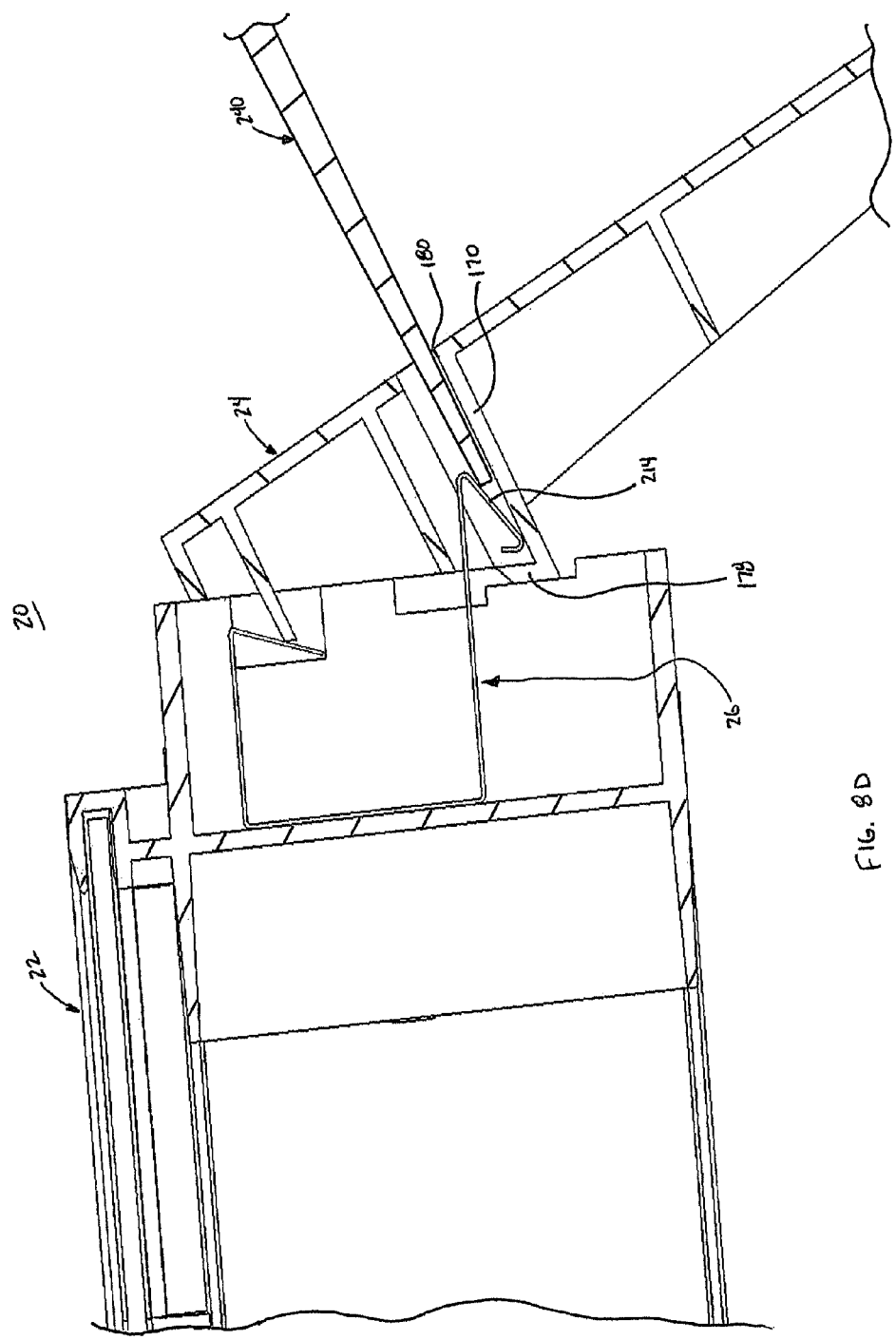
FIG. 8D is a cross-sectional view of the mounted state of FIG. 8A and illustrating an optional tool useful for dislodging the deflector from the mounted state.

In the mounted state, the clip(s) 26 are exteriorly encompassed by the deflector 24 (and possibly in part by the trailing frame member 62). While the clip(s) 26 may be accessible via the corresponding passage(s) 180, no portion of the clip(s) 26 is exteriorly exposed. Thus, where the clip(s) 26 is formed of metal (e.g., a metal spring) and the deflector 24 is formed of an electrically non-conductive material, the clip(s) 26 is protected from inadvertent contact with an installer's hands such that in the event the metal clip(s) 26 is electrically energized, the installer will not inadvertently be harmed. In some embodiments, to remove the deflector 24 from the clip(s) 26, a tool 240 can be inserted through the corresponding passage 180 as shown in FIG. 8D. The tool 240 can have a relatively simple configuration (e.g., wedge-like), and operates to disengage the head 214 from the first wall member 170 as well as the lip 178, thereby allowing the deflector 24 to be removed from the clip 26, and thus the PV module 22, where desired.

Figure 9B:
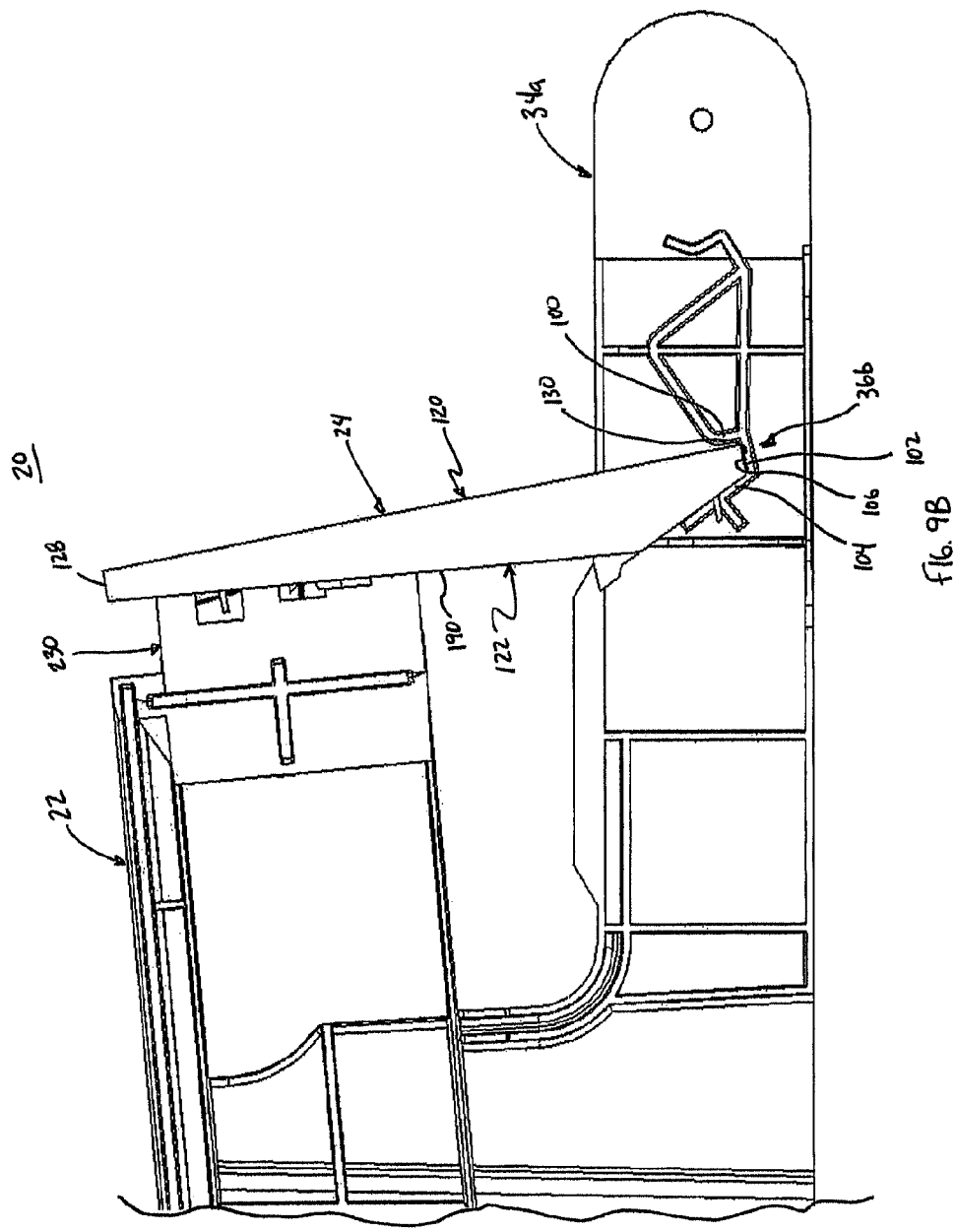

A second mounted state of the PV module assembly 20 is reflected in FIG. 9A. As compared to the first mounted state of FIG. 8A, the front face 120 of the deflector 24 is oriented at a wind deflecting angle or slope differing from that of the first mounted state. For example, the first mounted state can be defined as having a more gradual or gentle slope as compared to the second mounted state. The second mounted state includes the second end 130 of the deflector 24 being nested within the second seat 36b of the first support arm 34a (as well as a corresponding seat (hidden in FIG. 9A) of the second support arm 34b). As best shown in FIG. 9B, the second end 130 is received within the slot 106, with one or more of the side walls 100-104 optionally exerting a biasing force onto the deflector 24 to frictionally capture the second end 130 within the slot 106. Regardless, the first end 128 is vertically higher than the second end 130 (i.e., a reverse or opposite orientation as compared to the first mounted state of FIG. 8B), with the first segment 190 of the rear face 122 abutting the support column 230.

Figure 9C:
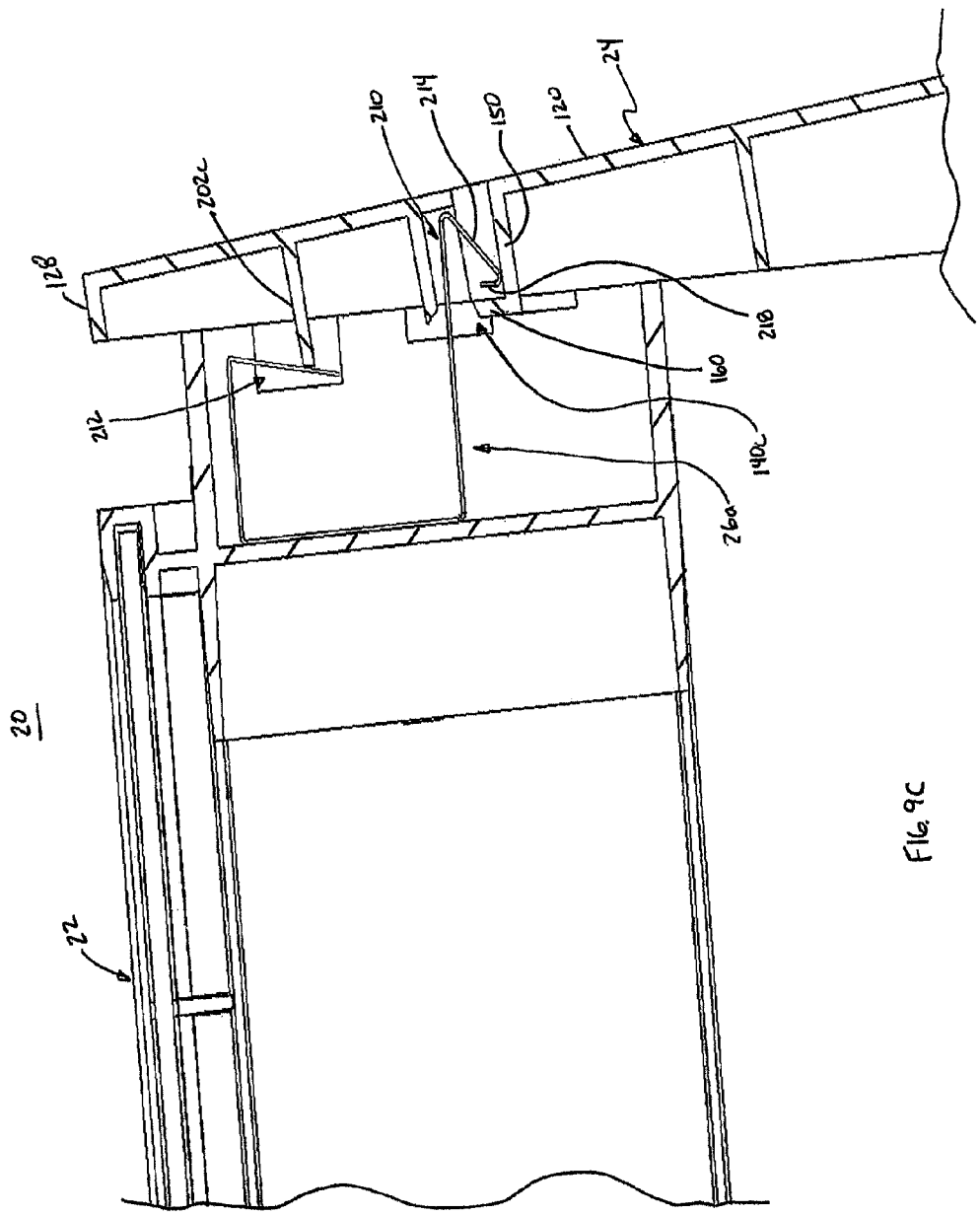

FIG. 9C reflects that in the second mounted state, the retention portion 210 of the clip 26a is received within the third receptacle 140c, with the head 214 bearing against the first wall member 150, thereby "locking" the deflector 24 to the orientation illustrated. Once again, the lip 160 and the finger 218 prevent unintended dislodgement of the retention portion 210 from the third receptacle 140c. Further, the slat segment 202c interfaces with the load portion 212 as described above, thereby minimizing the effect of vibrational or rattling forces experienced by the deflector 24.

As with the first mounted state, the second mounted state of FIGS. 9A-9C can be achieved by initially positioning the second end 130 within the second seat 36b, and then rotating the first end 128 toward the trailing frame member 62 (effectively pivoting at the interface between the second end 130 and the second seat 36b). With this movement, the retention portion 210 is naturally aligned with the third receptacle 140c, and the locked relationship is facilitated without requiring installation tools.

Figure 10:
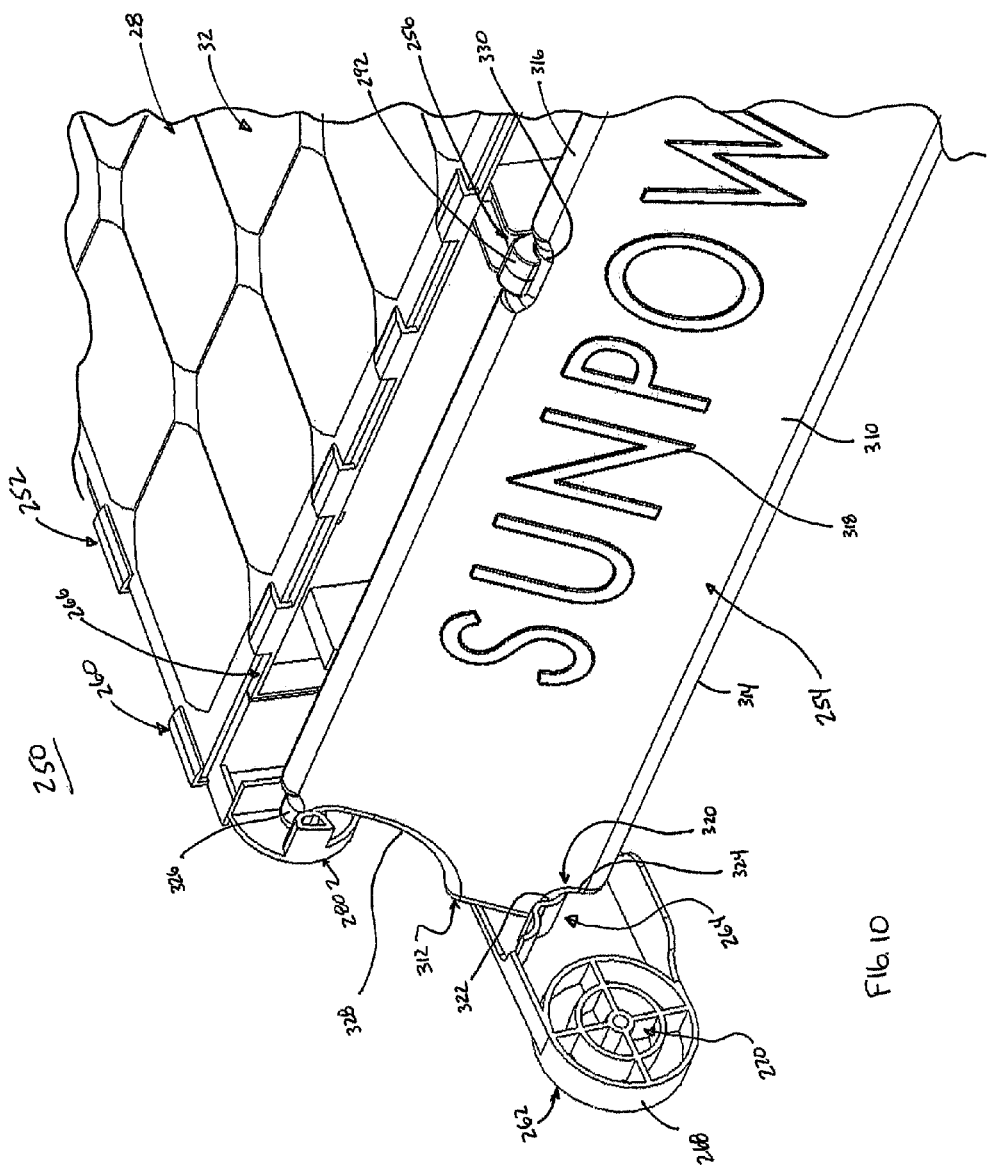
FIG. 10 is an enlarged, perspective view of another photovoltaic module assembly in accordance with principles of the present disclosure.

Portions of another PV module assembly 250 in accordance with principles of the present disclosure are shown in FIG. 10. The PV module assembly 250 includes a PV module 252, a deflector 254, and one (or more) clips 256. As described in greater detail below, the PV module assembly 250 is akin to the PV module assembly 20 (FIG. 1) previously described, and is configured such that the deflector 254 is removably mounted to the PV module 252 at two (or more) differing slopes or orientations.

The PV module 252 includes the PV device 28 (referenced generally) as previously described, and a frame 260. The PV laminate 32 of the PV device 28 is encased by the frame 260, with the frame 260 providing support faces that effectuate a tilted orientation of the PV laminate 32 relative to a flat, horizontal installation surface (e.g., a flat rooftop). The frame 260 further provides at least one support arm 262 forming one or more seats 264.

Figure 11:
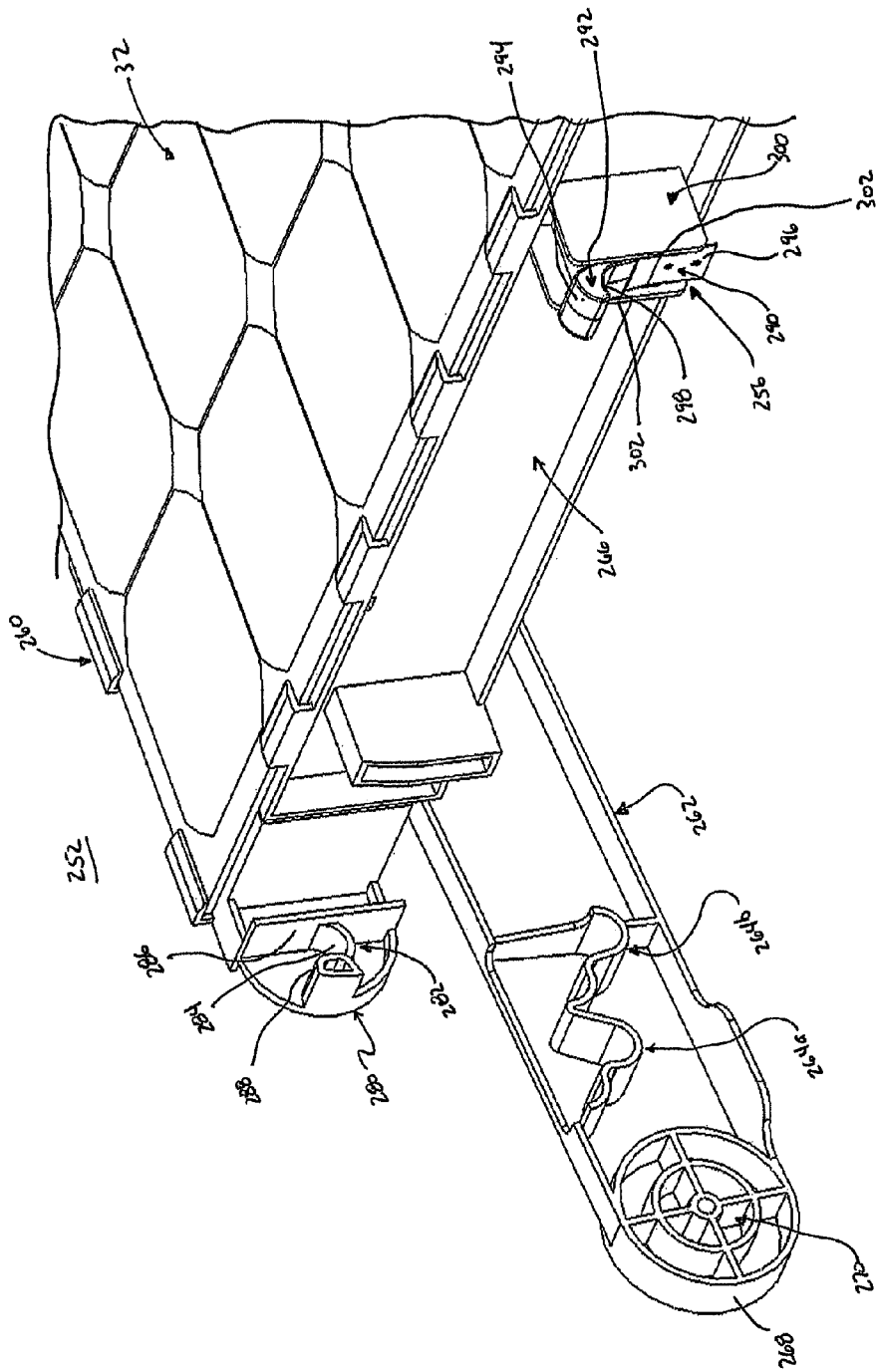
FIG. 11 is a perspective view of a portion of a photovoltaic module component of the assembly of FIG. 10.

More particularly, and as shown in FIG. 11, first and second seats 264a, 264b are formed along the support arm 262 at a location longitudinally spaced from a trailing frame member 266. As with previous embodiments, the seats 264a, 264b are formed between the trailing frame member 266 and a trailing end 268 of the support arm 262, for example adjacent a mounting region 270 provided by the support arm 262. The seats 264a, 264b are each sized and shaped to frictionally receive a portion of the deflector 254 (FIG. 10), with the first seat 264a being formed longitudinally beyond (i.e., more proximate the trailing end 268) and vertically higher than the second seat 264b. As described below, the locations of the seats 264a, 264b is selected in accordance with dimensions of the deflector 254 to effectuate positioning of the deflector 254 relative to the trailing frame member 266 at a desired slope or tilt. Though not shown in FIGS. 10 and 11, the frame 260 can further include a second support arm that is identical to the support arm 262 (and thus forms the seats 264a, 264b) and extending relative to an opposing side of the trailing frame member 266 (i.e., akin to the first and second support arms 34a, 34b (FIG. 1) described above).

In some embodiments, the frame 260 further includes a guide piece 280 forming a capture feature 282. The capture feature 282 is configured to frictionally receive and maintain a corresponding component of the deflector 254 (FIG. 10), and in some embodiments includes a bearing surface 284 extending between opposing walls 286, 288. For reasons made clear below, the bearing surface 284 is curved or arcuate in some constructions, and is positioned at a predetermined spatial location relative to the support arm 262 and the clip 256. For example, the bearing surface 284 can be co-axially aligned with the clip 256. Though not shown in FIG. 11, a second guide piece forming an identical capture feature can be formed as a mirror image of the guide piece 280, projecting from the trailing frame member 266 at an opposite side thereof.

The clip 256 can include a metal spring 290 forming a finger 292. In some embodiments, at least the finger 292 is encased in plastic 294, with a base 296 being affixed to the trailing frame member 266. With this construction, the plastic-encased finger 292 is deflectable relative to the base 296, and thus relative to the trailing frame member 266, and form an engagement surface 298. Finally, the clip 256 is disposed within a column 300 formed by the trailing frame member 266 and providing one or more stop surfaces 302. As with previous embodiments, the PV module assembly 250 can optionally include two or more of the clips 256. Further, while the clip 256 has been described and illustrated as being assembled to the PV module 252, in other embodiments the clip 256 can be assembled to, or provided as part of, the deflector 254 (FIG. 10).

Returning to FIG. 10, the deflector 254 generally includes or defines a front face 310, opposing sides 312 (one of which is shown in FIG. 10), and opposing, first and second ends 314, 316. The deflector 254 further incorporates one or more features that facilitate releasable mounting to the PV module 252 as described below. Regardless, the front face 310 is substantially flat or planar, serving to direct wind in a desired fashion upon mounting of the deflector 254 to the PV module 252. In some embodiments, the front face 310 displays indicia 318, for example a trade name or trademark, such as where the deflector 254 is optionally formed as a blow molded part.

The deflector 254 forms a recess 320 at an intersection of the side 312 and the first end 314. With this construction, the recess 320 is defined in part by a bearing face 322 (referenced generally) that is sized to be received within the seats 264. In some embodiments, the bearing face 322 is curved or arcuate in shape, with the recess 320 further being defined by a side face 324 projecting from the bearing face 322 to the first end 314. As shown in FIG. 10, the deflector 254 is sized and shaped such that when the bearing face 322 is lodged within one of the seats 264, the side face 324 extends about or "clears" the corresponding seat 264. Though not shown, a similar recess is formed at an opposite side of the deflector 254 at the corresponding intersection with the first end 314.

The deflector 254 further includes a hub 326 as a projection from the side 312 adjacent the second end 316. The hub 326 is sized to be received within the capture feature 282, and in some embodiments is circular in cross-section, corresponding with a curvature of the bearing surface 284 (FIG. 11). With this construction, then, the hub 326 is rotatable within the capture feature 282 upon assembly. In addition, to facilitate desired interface between the hub 326 and the capture feature 282, in some embodiments the deflector 254 forms an aperture 328 along the side 312 as shown. Though not illustrated in FIG. 10, the deflector 254 can include a second, identical hub projecting from the opposing side (not shown).

Finally, the deflector 254 is configured for releasable engagement with the clip 256. For example, in some embodiments, a channel 330 is formed along the second end 316, and is sized to receive the finger 292. Alternatively, other constructions appropriate for frictional engagement with the engagement surface 298 (FIG. 11) can be incorporated into, or formed by, the deflector 254.

The PV module assembly 250 is configured to provide two differing slopes or orientations of the deflector 254 relative to the PV module 252 during use. For example, a first mounted state of the PV module assembly 250 is reflected in FIG. 10, and includes the bearing face 322 of the deflector 254 nested within the first seat 264a of the PV module 252. The hub 326 is lodged within the capture feature 282, nesting against the bearing surface 284 (best shown in FIG. 11). Finally, the finger 292 nests within the channel 330, imparting a biasing force onto the deflector 254. As a result, the deflector 254 is effectively locked relative to the PV module 252.

The mounted relationship is more clearly reflected in FIG. 12. As shown, the clip 256 imparts a biasing force onto the deflector 254 via the finger 292, effectively locking the deflector 254 against the first seat 264a and the bearing surface 284 (referenced generally). The deflector 254 is readily removed from the first mounted state by the installer forcing the finger 292 away from engagement with the deflector 254. In this regard, the finger 292 can be removed from the deflector 254 by an installer's hand (e.g., thumb), such that the PV module assembly 250 requires no tools for mounting or removal of the deflector 254. Once the finger 292 is clear of the deflector 254, the deflector 254 can be removed from the first seat 264a and the capture feature 282.

Though not shown, a second mounting state of the PV module assembly 250 includes the deflector 254 being frictionally mounted within or to the second seat 264b. The hub 326 is again engaged (or remains engaged) within the capture feature 282, rotatably supported by the bearing surface 284. Further, the clip 256 engages the deflector 254 as described above. In contrast to the first mounted state, the second mounted state includes the deflector 254 oriented at a more severe or perpendicular-like slope as compared to the first mounted state. As compared to the PV module assembly 20 (FIG. 1) described above, with the PV module assembly 250, the deflector 254 is not reversed or "flipped" in transitioning between the first and second mounted states. Instead, the front face 310 serves as the exterior surface of the deflector 254 in both of the first and second mounted states.

In some embodiments, the PV module assembly 20 (FIG. 1), 250 is provided as part of a PV module kit 350 illustrated in an installed state in FIG. 13. In general terms, the kit 350 includes two or more of the PV module assemblies 20, 250 described above (e.g., the first-fourth PV module assemblies 20a-20d illustrated in FIG. 13), with the kit 350 being installable in a non-penetrating fashion to an installation surface as part of a PV module array 352. For example, the support arms 34a, 34b of the first PV module assembly 20a are connected to the coupling arms 52a, 52b of the second PV module assembly 20b. A similar relationship is established between the third and fourth PV module assemblies 20c, 20d. As shown, the deflectors 24 of the first and third PV module assemblies 20a, 20c are arranged in the second mounted state. Though not shown, the deflectors 24 of the second and/or fourth PV module assemblies 20b, 20d can be arranged in the second mounted state, the first mounted state, or omitted. Regardless, by arranging the first and third PV module assemblies 20a, 20c in the second mounted state, desired wind deflection is provided, yet an open space 354 remains between the leading frame members 60 of the second and fourth PV module assemblies 20b, 20d and the deflectors 24 of the first and third PV module assemblies 20a, 20c. The space 354 provides a convenient region or walkway for an installer during assembly or installation of the PV module array 352. Conversely, where space is of less concern and/or a more gradual slope desired (e.g. PV module assemblies located at the northern edge of the array 352 (for northern hemisphere installations)), the first mounted state can be readily implemented by the installer.

In addition to providing the installed state of FIG. 14, in some embodiments the kit 350 provides a shipping state as shown in FIG. 14. In particular, the framework 50 of the illustrated PV module assemblies 20a-20c are stacked onto one another in a highly compact form, and the corresponding deflectors 24 are arranged one over the other. In the shipping state, then, the kit 350 presents the PV module assemblies 20a-20c in a closely stacked or nested arrangement for high shipping density, thereby greatly minimizing shipping (and related packaging) waste.

Returning to FIGS. 1 and 10, the deflector 24, 254 can be formed from various materials exhibiting appropriate strength and stiffness. In some embodiments, the deflector 24, 254 is formed entirely of plastic or polymeric material(s). For example, the deflector 24, 254 can be a molded polymeric component such as blow molded or injection molded PPO/PS (Polyphenylene Oxide co-polymer/polystyrene blend) or PET (Polyethylene Terephthalate), although other polymeric, electrically insulative materials are also acceptable. With these constructions, then, use of the optional non-conductive deflector 24, 254 as part of the PV module assembly 20, 250 does not require additional grounding components (or related procedures) during installation. In a related embodiment, the frame 30, 260 is similarly entirely formed of an electrically non-conductive plastic or polymeric material(s), again obviating the need for electrically grounding the PV module assembly 20, 250 as part of the installation process. Alternatively, however, one or both of the deflector 24, 254 and/or the frame 30, 260 can be partially or entirely formed of metal.

The PV module assembly of the present disclosure provides a marked improvement over previous designs. The deflector is quickly and easily installed relative to the PV module without requiring tools. Further, the deflector can be oriented at least two different deflection angles/slopes, and has minimal impact on an overall footprint of the PV module assembly.

Although the present disclosure has been described with reference to preferred embodiments, workers skilled in the art will recognize that changes can be made in form and detail without departing from the spirit and scope of the present disclosure.

What is claimed is:

1. A photovoltaic module assembly for non-penetrating installation to a substantially flat surface, the assembly comprising:
    a photovoltaic module including:
        a device including a photovoltaic laminate,
        a frame assembled to the photovoltaic laminate, the frame including:
            framework encompassing a perimeter of the photovoltaic laminate and having a trailing frame member and a leading frame member, first and second support arms extending from the framework and beyond the trailing frame member, the first support arm forming a first seat, and third and fourth support arms extending from the framework and beyond the leading frame member; and
    a deflector defining a front face and a rear face;
    wherein the assembly is configured to provide a first mounted state in which the deflector is nested within the first seat, and wherein the first seat includes side walls forming a slot sized to frictionally receive a portion of the deflector.

2. The assembly of claim 1, wherein the first support arm further forms a second seat for frictionally receiving a portion of the deflector, the second seat being longitudinally disposed between the trailing frame member and the first seat.

3. The assembly of claim 2, wherein:
    the deflector includes opposing, first and second sides and opposing, first and second ends;
    the first mounted state includes a portion of the first end disposed within the first seat; and
    the assembly is configured to provide a second mounted state in which a portion of the second end is disposed within the second seat.

4. The assembly of claim 3, wherein relative to a transverse plane of the deflector, the rear face includes a first segment extending from the first end to define a first angle and a second segment extending from the second end to define a second angle, and further wherein the first angle and the second angle are different.

5. The assembly of claim 4, wherein the first angle is less than the second angle.

6. The assembly of claim 4, wherein a length of the first segment is greater than a length of the second segment.

7. The assembly of claim 4, wherein the first mounted state includes the second segment abutting the trailing frame member and the second mounted state includes the first segment abutting the trailing frame member.

8. The assembly of claim 4, wherein the first and second segments are defined at the first side of the deflector.

9. The assembly of claim 8, wherein the first mounted state includes a first portion of the first side disposed within the first seat, and the second mounted state includes a second portion of the first side disposed within the second seat.

10. The assembly of claim 1, wherein the first support arm forms a mounting region adapted for mounting to a second photovoltaic module, the first seat being longitudinally located between the mounting region and the trailing frame member.

11. The assembly of claim 1, wherein the first support arm defines a lower face for placement on a flat surface in supporting the photovoltaic laminate relative to the flat surface, the lower face defining a plane that is non-parallel relative to a plane of the photovoltaic laminate.

12. The assembly of claim 1, wherein the second support arm forms a seat that is laterally aligned with the first seat of the first support arm and configured to frictionally receive a portion of the deflector.

13. The assembly of claim 1, wherein an entirety of the deflector is plastic and an entirety of the framework is plastic.

14. A photovoltaic module assembly for non-penetrating installation to a substantially flat surface, the assembly comprising:
    a photovoltaic module including:
        a device including a photovoltaic laminate,
        a frame assembled to the photovoltaic laminate, the frame including:
            framework encompassing a perimeter of the photovoltaic laminate and having a trailing frame member and a leading frame member, first and second support arms extending from the framework and beyond the trailing frame member, the first support arm forming a first seat, and third and fourth support arms extending from the framework and beyond the leading frame member; and
    a deflector defining a front face and a rear face;
    wherein the assembly is configured to provide a first mounted state in which the deflector is nested within the first seat, and wherein the first support arm further forms a second seat for frictionally receiving a portion of the deflector, the second seat being longitudinally disposed between the trailing frame member and the first seat, wherein:

the deflector includes opposing, first and second sides and opposing, first and second ends;

the first mounted state includes a portion of the first end disposed within the first seat; and the assembly is configured to provide a second mounted state in which a portion of the second end is disposed within the second seat, and wherein relative to a transverse plane of the deflector, the rear face includes a first segment extending from the first end to define a first angle and a second segment extending from the second end to define a second angle, and further wherein the first angle and the second angle are different.

15. The assembly of claim 14, wherein the first angle is less than the second angle.

16. The assembly of claim 14, wherein a length of the first segment is greater than a length of the second segment.

17. The assembly of claim 14, wherein the first mounted state includes the second segment abutting the trailing frame member and the second mounted state includes the first segment abutting the trailing frame member.

18. The assembly of claim 14, wherein the first and second segments are defined at the first side of the deflector.

19. The assembly of claim 18, wherein the first mounted state includes a first portion of the first side disposed within the first seat, and the second mounted state includes a second portion of the first side disposed within the second seat.

20. The assembly of claim 14, wherein the first support arm forms a mounting region adapted for mounting to a second photovoltaic module, the first seat being longitudinally located between the mounting region and the trailing frame member.

21. The assembly of claim 14, wherein the first support arm defines a lower face for placement on a flat surface in supporting the photovoltaic laminate relative to the flat surface, the lower face defining a plane that is non-parallel relative to a plane of the photovoltaic laminate.

22. The assembly of claim 14, wherein the second support arm forms a seat that is laterally aligned with the first seat of the first support arm and configured to frictionally receive a portion of the deflector.

23. The assembly of claim 14, wherein an entirety of the deflector is plastic and an entirety of the framework is plastic.

* * * * *